United States Patent
Tsuge et al.

(10) Patent No.: US 9,862,168 B2
(45) Date of Patent: *Jan. 9, 2018

(54) ALLOYING ELEMENT-SAVING HOT ROLLED DUPLEX STAINLESS STEEL MATERIAL, CLAD STEEL PLATE HAVING DUPLEX STAINLESS STEEL AS CLADDING MATERIAL THEREFOR, AND PRODUCTION METHOD FOR SAME

(75) Inventors: Shinji Tsuge, Hikari (JP); Yuusuke Oikawa, Hikari (JP); Yoichi Yamamoto, Kitakyushu (JP); Haruhiko Kajimura, Hikari (JP); Kazuhiko Ishida, Kitakyushu (JP)

(73) Assignee: NIPPON STEEL & SUMIKIN STAINLESS STEEL CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/978,743

(22) PCT Filed: Jan. 26, 2012

(86) PCT No.: PCT/JP2012/051637
§ 371 (c)(1),
(2), (4) Date: Jul. 9, 2013

(87) PCT Pub. No.: WO2012/102330
PCT Pub. Date: Aug. 2, 2012

(65) Prior Publication Data
US 2013/0288074 A1 Oct. 31, 2013

(30) Foreign Application Priority Data

Jan. 27, 2011 (JP) .................................. 2011-015091
Mar. 2, 2011 (JP) .................................. 2011-044735

(51) Int. Cl.
| | | |
|---|---|---|
| *B32B 15/01* | (2006.01) |
| *C22C 38/00* | (2006.01) |
| *C22C 38/50* | (2006.01) |
| *B23K 20/04* | (2006.01) |
| *C21D 8/02* | (2006.01) |
| *B21B 3/00* | (2006.01) |
| *C22C 38/02* | (2006.01) |
| *C22C 38/04* | (2006.01) |
| *C22C 38/06* | (2006.01) |
| *C22C 38/42* | (2006.01) |
| *C22C 38/44* | (2006.01) |
| *C22C 38/46* | (2006.01) |
| *C22C 38/48* | (2006.01) |
| *C22C 38/52* | (2006.01) |

(Continued)

(52) U.S. Cl.
CPC .............. *B32B 15/011* (2013.01); *B21B 3/00* (2013.01); *B23K 20/04* (2013.01); *B32B 15/01* (2013.01); *C21D 8/0226* (2013.01); *C22C 38/00* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *C22C 38/54* (2013.01); *C22C 38/58* (2013.01); *Y10T 428/12965* (2015.01)

(58) Field of Classification Search
USPC ..................................... 428/681–685; 420/34
See application file for complete search history.

(56) References Cited

U.S. PATENT DOCUMENTS

| 4,657,606 A | 4/1987 | Guha et al. |
| 4,798,635 A | 1/1989 | Bernhardsson et al. |
| 4,985,091 A | 1/1991 | Culling |

(Continued)

FOREIGN PATENT DOCUMENTS

| CN | 1514885 | 7/2004 |
| CN | 1914344 | 2/2007 |

(Continued)

OTHER PUBLICATIONS

International Search Report dated May 1, 2012 issued in corresponding PCT Application No. PCT/JP2012/051637 [With English Translation].

(Continued)

*Primary Examiner* — Humera Sheikh
*Assistant Examiner* — Lucas Wang
(74) *Attorney, Agent, or Firm* — Birch, Stewart, Kolasch & Birch, LLP

(57) ABSTRACT

This alloying element-saving hot rolled duplex stainless steel material contains, by mass %, C: 0.03% or less, Si: 0.05% to 1.0%, Mn: 0.5% to 7.0%, P: 0.05% or less, S: 0.010% or less, Ni: 0.1% to 5.0%, Cr: 18.0% to 25.0%, N: 0.05% to 0.30% and Al: 0.001% to 0.05%, with a remainder being Fe and inevitable impurities, wherein the alloying element-saving hot rolled duplex stainless steel material is produced by hot rolling, a chromium nitride precipitation temperature TN is in a range of 960° C. or lower, a yield strength is 50 MPa or more higher than that of a hot rolled steel material which is subjected to a solution heat treatment, and the alloying element-saving hot rolled duplex stainless steel material is as hot rolled state, and is not subjected to a solution heat treatment. This clad steel plate includes a duplex stainless steel as a cladding material, the duplex stainless steel has the above composition, and the chromium nitride precipitation temperature TN is in a range of 800° C. to 970° C.

14 Claims, No Drawings

(51) Int. Cl.
  *C22C 38/54* (2006.01)
  *C22C 38/58* (2006.01)

(56) References Cited

U.S. PATENT DOCUMENTS

| | | |
|---|---|---|
| 5,672,215 A | 9/1997 | Azuma et al. |
| 5,672,315 A | 9/1997 | Okato et al. |
| 5,849,111 A | 12/1998 | Igarashi et al. |
| 2004/0042926 A1 | 3/2004 | Shimizu et al. |
| 2006/0243356 A1 | 11/2006 | Oikawa et al. |
| 2007/0163679 A1 | 7/2007 | Fujisawa et al. |
| 2009/0098007 A1 | 4/2009 | Tsuge et al. |
| 2010/0000636 A1 | 1/2010 | Bonnefois et al. |
| 2010/0172785 A1 | 7/2010 | Alfonsson et al. |
| 2011/0097234 A1 | 4/2011 | Oikawa et al. |
| 2011/0236248 A1 | 9/2011 | Hatano et al. |

FOREIGN PATENT DOCUMENTS

| | | |
|---|---|---|
| CN | 101346486 | 1/2009 |
| CN | 101748343 | 6/2010 |
| CN | 101768702 | 7/2010 |
| CN | 101981216 | 2/2011 |
| EP | 0107489 | 5/1984 |
| EP | 0 455 625 A1 | 11/1991 |
| EP | 0534864 | 3/1993 |
| EP | 0750053 | 12/1996 |
| EP | 0757112 | 2/1997 |
| EP | 1561834 A1 | 8/2005 |
| EP | 1867748 A1 | 12/2007 |
| EP | 2050832 | 4/2009 |
| EP | 2258885 | 8/2010 |
| JP | 57-016153 | 1/1982 |
| JP | 59-059826 A | 4/1984 |
| JP | 60-197824 | 10/1985 |
| JP | 61-056236 | 3/1986 |
| JP | 61-056267 | 3/1986 |
| JP | 62-110880 | 5/1987 |
| JP | 01-100247 | 4/1989 |
| JP | 01-100248 | 4/1989 |
| JP | 01-316439 | 12/1989 |
| JP | 03-082739 | 4/1991 |
| JP | 03-158437 | 7/1991 |
| JP | 04-072013 | 3/1992 |
| JP | 4-22677 | 4/1992 |
| JP | 06-036993 | 5/1994 |
| JP | 06-200353 | 7/1994 |
| JP | 07-118805 | 5/1995 |
| JP | 07-278755 | 10/1995 |
| JP | 07-292445 | 11/1995 |
| JP | 11-080901 | 3/1999 |
| JP | 2000-144342 | 5/2000 |
| JP | 2001-020046 | 1/2001 |
| JP | 2002-030324 | 1/2002 |
| JP | 2002-030395 | 1/2002 |
| JP | 2002-069592 | 3/2002 |
| JP | 2002-241838 | 8/2002 |
| JP | 2003-147489 | 5/2003 |
| JP | 2005-520934 | 7/2005 |
| JP | 2006-117991 | 5/2006 |
| JP | 2006-183129 | 7/2006 |
| JP | 2006-200035 | 8/2006 |
| JP | 2006-233308 | 9/2006 |
| JP | 2006-241590 | 9/2006 |
| JP | 2007-084841 | 4/2007 |
| JP | 2008-038214 | 2/2008 |
| JP | 2010-084220 | 4/2010 |
| JP | 2010-222593 | 10/2010 |
| JP | 2010-222695 A | 10/2010 |
| JP | 2010229459 | 10/2010 |
| JP | 2012-197509 | 10/2012 |
| RU | 2001156 C1 | 10/1993 |
| WO | WO 96/18751 | 6/1996 |
| WO | WO 02/27056 | 4/2002 |
| WO | WO 03/080886 | 10/2003 |
| WO | WO 2008/018242 | 2/2008 |
| WO | WO 2009/044135 | 4/2009 |
| WO | 2009/119895 | 10/2009 |
| WO | WO 2010/070202 | 6/2010 |
| WO | 2011102499 | 8/2011 |
| WO | WO 2012/121380 | 9/2012 |

OTHER PUBLICATIONS

Japanese Office Action dated Jun. 18, 2013 from corresponding JP Application No. 2011-015091 [With English Translation].
Japanese Office Action dated Jun. 18, 2013 from corresponding JP Application No. 2011-044735 [With English Translation].
Office Action dated Sep. 28, 2014 issued in related Chinese Application No. 201280004715.3 [with English Translation of Search Report].
Imai et al., "Effect of Cu, Sn and Ni on Hot Workability of Hot-rolled Mild Steel", ISIJ, vol. 37, pp. 217-223 (1997).
"Tetsu-to-Hagane", The Journal of the Iron and Steel Institute of Japan, vol. 63 (1977), No. 5, pp. 772-782 and cover.
International Search Report dated Jan. 8, 2013, issued in the corresponding PCT Application PCT/JP2012/076821.
Notice of Allowance dated Jul. 23, 2013, issued in the corresponding Japanese Application 2011-231352.
Office Action dated Mar. 26, 2014, issued in the corresponding Taiwanese Application 101138219 [English translation attached].
Office Action dated Apr. 3, 2015, issued in the corresponding Chinese Application 201280050356.5 [English translation attached].
International Search Report dated Jun. 5, 2012, issued in the corresponding PCT Application PCT/JP2009/056154.
European Search Report dated Mar. 17, 2015, issued in the corresponding EP Application 12754869.1.
International Search Report dated Jul. 21, 2009, issued in the corresponding PCT Application PCT/JP2009/056840.
Office Action dated Mar. 1, 2012, issued in the corresponding U.S. Appl. No. 12/736,255.
Office Action dated May 28, 2009, issued in the corresponding U.S. Appl. No. 11/991,671.
Office Action dated Jan. 28, 2010, issued in the corresponding Korean Application 10-2008-1006096 [English translation attached].
Office Action dated Jun. 4, 2010, issued in the corresponding U.S. Appl. No. 11/991,671.
Office Action dated Oct. 25, 2010, issued in the corresponding U.S. Appl. No. 11/991,671.
European Search Report dated Nov. 30, 2010, issued in the corresponding EP Application 07745544.2.
Office Action dated Nov. 15, 2011, issued in the corresponding U.S. Appl. No. 11/991,671.
Search Report dated Feb. 9, 2016 issued in related European Application No. 12842430.6.
"Recommended Equilibrium Value of Steel making Reactions," The Japan Society of promotion of Science, Steel making No. 19 Committee ed., Nov. 1, 1984, pp. 258-259 (cover and content), with English Translation.
Non-Final Office Action issued in U.S. Appl. No. 14/004,039, dated Oct. 9, 2015.
Office Action issued in CN Patent Application No. 200980110816.7, dated Dec. 23, 2011 (with English Translation).
Extended European Search Report for European Application No. 12738972.4, dated Jul. 7, 2016.
European Search Report dated Jul. 17, 2015 issued in corresponding EP Application No. 12842430.6.
Final Office Action issued in U.S. Appl. No. 14/347,437, dated Aug. 22, 2017.
S. Bell et al."Final report on effect of impurities in steel"; Report No. 2005-41(CF). Government of Canada. Enhanced Recycling, Action Plan 2000 on Climate Change, Minerals and Metals Program; Mar. 2006.

ALLOYING ELEMENT-SAVING HOT ROLLED DUPLEX STAINLESS STEEL MATERIAL, CLAD STEEL PLATE HAVING DUPLEX STAINLESS STEEL AS CLADDING MATERIAL THEREFOR, AND PRODUCTION METHOD FOR SAME

TECHNICAL FIELD

The present invention relates to a cheap alloying element-saving hot rolled duplex stainless steel material, on which a solution heat treatment is not carried out, a clad steel plate including the duplex stainless steel as a cladding material, and production methods for the same. In particular, the invention relates to a high-strength hot rolled duplex stainless steel material that can be used as a seawater desalination instrument, tanks in a shipping vessel, a variety of containers and the like, a clad steel plate including the duplex stainless steel as a cladding material, and production methods for the same.

This application is a national stage application of International Application No. PCT/JP2012/051637, filed Jan. 26, 2012, which claims priority to Japanese Patent Application No. 2011-15091 filed on Jan. 27, 2011, and Japanese Patent Application No. 2011-44735 filed on Mar. 2, 2011, the contents of which are incorporated herein by reference.

BACKGROUND ART

A duplex stainless steel contains a large amount of Cr, Mo, Ni and N, and intermetallic compounds and nitrides are easily precipitated.

Therefore, a solution heat treatment was carried out at a temperature of 1000° C. or higher so as to solid-solubilize the precipitates; and thereby, the duplex stainless steel was produced as a hot rolled steel material. In addition, when manufacturing a clad steel plate including the duplex stainless steel as a cladding material, the following techniques were applied.

A technique in which a chemical composition of a carbon steel is designed so as to maintain mechanical characteristics through a heat treatment at a high temperature of 1000° C. or higher, and this carbon steel is used as a base metal (Patent Document 1 and the like).

A technique in which hot rolling conditions are controlled; and thereby, a duplex stainless clad steel plate is produced without a heat treatment (Patent Document 2 and the like).

A technique in which reheating is carried out during hot rolling; and thereby, precipitation in a cladding material is suppressed (Patent Document 3 and the like).

By the way, in recent years, alloying element-saving duplex stainless steel has been developed in which contents of Ni, Mo and the like are saved, and a steel having a greatly decreased precipitation sensitivity of intermetallic compounds has been put into practical use.

Chromium nitrides are precipitates having a major influence on the material quality of the alloying element-saving duplex stainless steel. The chromium nitrides are precipitates generated by the combination of Cr and N, and, in the duplex stainless steel, cubic CrN or hexagonal $Cr_2N$ is frequently precipitated in ferrite grains or ferrite grain boundaries. In the case where these chromium nitrides are generated, impact property degrades, and corrosion resistance degrades due to a chromium-depleted layer generated by the precipitation.

The present inventors clarified the relationship between the precipitation of the chromium nitrides and component composition, and designed material qualities based on an idea of suppressing the precipitation of the chromium nitrides by controlling the component composition. As a result, the inventors invented and disclosed an alloying element-saving duplex stainless steel having favorable corrosion resistance and favorable impact property (Patent Document 4). Particularly, the content of Mn is increased; and thereby, the precipitation of the chromium nitrides is suppressed, and this technique is reflected in the component design of new alloying element-saving duplex stainless steel. And, due to its low cost and excellent characteristics such as corrosion resistance, the alloying element-saving duplex stainless steel has already been in use in a variety of fields.

The alloying element-saving duplex stainless steel is also expected to be used as a hot rolled steel plate. Generally, the hot rolled steel plate has a large thickness, since the hot rolled steel plate is not subjected to cold rolling, and the hot rolled steel plate is used particularly in a field where strength or toughness is required. Examples thereof include seawater desalination instruments, tanks in a shipping vessel and the like, and in the past, austenitic stainless steel was used in the majority of the above-described uses.

However, the duplex stainless steel generally has a higher strength than austenitic stainless steel; and therefore, the duplex stainless steel is advantageous in that the duplex stainless steel can be thinned while maintaining a necessary strength. In addition, since the used amount of expensive elements is small, the cost is low. For the above-described reasons, the duplex hot rolled stainless steel material has already been in use in some of the above-described uses.

On the other hand, toughness is a problem when the duplex hot rolled stainless steel material is used. That is, the duplex stainless steel includes a ferrite phase together with an austenite phase which is generally considered not to cause brittle fracture. Therefore, the duplex stainless steel exhibits the same ductile-brittle transition as that of a ferritic stainless steel in terms of impact toughness, and the duplex stainless steel has poor toughness compared to an austenitic stainless steel.

A number of studies have thus far been made regarding the above-described problem. The inventors clarifies the relationship between a steel structure and the toughness of the duplex hot rolled stainless steel plate in Patent Document 5, and the inventors discloses that the toughness can be improved by controlling a chemical composition and a heat treatment method.

In addition, the inventors newly paid attention to the application of the above-described alloying element-saving duplex stainless steel to a cladding material of a clad steel plate, and research and development were carried out. In the clad steel plate, corrosion resistance is given to the stainless steel used as the cladding material, and strength, toughness, and weldability are given to the base metal. Therefore, the clad steel plate is a hot rolled steel in which multiple characteristics can be obtained economically.

The clad steel plate is used at a portion at which the stainless steel and the base metal are structurally joined, and the clad steel plate generally has a large thickness, and is used particularly in a filed where strength or toughness is required. Examples thereof include seawater desalination instruments, tanks in a shipping vessel and the like, and, in the past, an austenitic stainless steel was used as a cladding material in the majority of the above-described uses.

However, there is an ongoing trend for the stainless steel in the above-described uses to be changed to a cheap duplex stainless steel, and there is an increasing demand for a cheaper clad steel plate including a duplex stainless steel as the cladding material.

By the way, in a production process of a duplex hot rolled stainless steel plate described in Patent Document 5 and in a production process of a clad steel plate of the related art, a solution heat treatment is indispensable. In order to solve the problem caused by the inter metallic compound or the chromium nitrides that degrade the corrosion resistance and the problem of toughness in the duplex stainless steel as described above, a solution heat treatment is required. Particularly, the alloying element-saving duplex stainless steel, which is the subject of the invention, has a property that easily allows the precipitation of nitrides in a temperature range of hot working, and the chromium nitrides are dispersed in the steel material when hot rolling is completed. Thereby, the impact property and the corrosion resistance degrade.

In the production process of the alloying element-saving duplex stainless steel, the chromium nitrides can be removed by carrying out the solution heat treatment. However, since the solution heat treatment decreases the strength, it can be also said that the solution heat treatment is not preferable in consideration of the uses of the hot rolled steel plate. Similarly, in the production process of the clad steel plate, the chromium nitrides in the cladding material can be removed by carrying out the solution heat treatment. However, in the case where the solution heat treatment is carried out at a temperature of 1000° C. or higher, the toughness of the base metal degrades; and therefore, the solution heat treatment is not preferable in consideration of the uses of the clad steel plate.

In addition, from the demand for the additional saving of costs or the recent demand for the saving of energy used, there is a demand for the saving of production costs or energy necessary for production through the removal of the solution heat treatment.

PRIOR ART DOCUMENT

Patent Document

Patent Document 1: Japanese Unexamined Patent Application, First Publication No. H7-292445
Patent Document 2: Japanese Examined Patent Application, Second Publication No. H4-22677
Patent Document 3: Japanese Examined Patent Application, Second Publication No. H6-36993
Patent Document 4: PCT International Publication No. WO2009-119895
Patent Document 5: Japanese Unexamined Patent Application, First Publication No. 2010-84220

DISCLOSURE OF THE INVENTION

Problems to be Solved by the Invention

An object of the invention is to provide an alloying element-saving hot rolled duplex stainless steel material maintaining strength, impact property and corrosion resistance even in a state of being hot rolled, and a production method of the alloying element-saving hot rolled duplex stainless steel material, in which a solution heat treatment is not carried out so that the cost is low, and only a small amount of energy is used, and which is excellent in terms of the environmental aspect.

In addition, another object of the invention is to provide a clad steel plate having both toughness of a base metal and corrosion resistance of an alloying element-saving duplex stainless steel as a cladding material, and a production method of the cheap clad steel plate, in which the solution heat treatment is not carried out so that only a small amount of energy is used, and which is excellent in terms of the environmental aspect.

Means for Solving the Problems

In order to solve the problem regarding the alloying element-saving hot rolled duplex stainless steel material, the inventors considered that it is necessary to obtain knowledge regarding a chemical composition of a hot rolled steel material, hot working conditions, a state of a metallic structure including a precipitation amount of chromium nitrides and the like, impact property, corrosion resistance and the like of a steel material (hot rolled steel material) to remove the solution heat treatment of the alloying element-saving duplex stainless steel, and the inventors carried out the following experiment.

As an index regarding the precipitation of the chromium nitrides during hot rolling, a chromium nitride precipitation temperature TN was newly set. A heating temperature of the hot rolling was adjusted in a range of 1150° C. to 1250° C. using steel materials having different chromium nitride precipitation temperatures TN, and an input side temperature TF of a final finishing rolling pass of the hot rolling and an accelerated cooling initiation temperature TC after the end of the hot rolling were varied respectively. Thereby, hot rolled steel materials having plate thicknesses of 6 mm to 35 mm were obtained. Then, strengths, impact properties and corrosion resistances of the obtained hot rolled steel materials and steel materials which were subjected to solution heat treatment were evaluated.

Through the above-described experiment, the alloying element-saving hot rolled duplex stainless steel material of the present invention was completed which was not subjected to the solution heat treatment and was cheap.

In order to solve the problem regarding the clad steel plate, the inventors considered that, in the case where chromium nitrides are not precipitated in a duplex stainless steel which is a cladding material during a step of joining a base metal and a cladding material by hot rolling in a production process of the clad steel plate, corrosion resistance is not impaired even when the solution heat treatment, which is a post treatment, may be removed.

Therefore, the inventors considered to find a solution by using an alloying element-saving duplex stainless steel, which can maintain excellent corrosion resistance even when the hot rolling temperature is decreased, as the cladding material of the clad steel plate.

Then, the inventors considered that, in order to obtain the above-described alloying element-saving duplex stainless steel, it is necessary to obtain knowledge regarding a chemical composition of a hot rolled steel material in which the solution heat treatment is removed in the production process, hot working conditions, a state of a metallic structure including a precipitation amount of chromium nitrides and the like, impact property, corrosion resistance and the like of a steel material, and the inventors carried out the following experiment.

As an index regarding the precipitation of the chromium nitrides during hot rolling, a chromium nitride precipitation temperature TN was newly set. A heating temperature of the hot rolling was adjusted in a range of 1150° C. to 1250° C. using steel materials having different chromium nitride precipitation temperatures TN, and an input side temperature TF of a final finishing rolling pass of the hot rolling and an accelerated cooling initiation temperature TC after the end of the hot rolling were varied respectively. Thereby, hot rolled steel materials having plate thicknesses of 10 mm to 35 mm were obtained. Then, strengths, impact properties and corrosion resistances of the obtained hot rolled steel materials and steel materials which were subjected to solution heat treatment were evaluated.

Next, the alloying element-saving duplex stainless steel obtained in the above-described experiment was used as a cladding material, the thickness of the cladding material was set to 3 mm, and a clad steel plate having a thickness set to be in a range of 10 mm to 35 mm was obtained by hot rolling. Then, strength, impact property and corrosion resistance were evaluated.

Through the above-described experiment, the clad steel plate of the invention was completed which included the alloying element-saving duplex stainless steel as a cladding material, and was not subjected to the solution heat treatment.

The summary of the invention will be described below.

(1) There is provided an alloying element-saving hot rolled duplex stainless steel material which includes, by mass %: C: 0.03% or less; Si: 0.05% to 1.0%; Mn: 0.5% to 7.0%; P: 0.05% or less; S: 0.010% or less; Ni: 0.1% to 5.0%; Cr: 18.0% to 25.0%; N: 0.05% to 0.30%; and Al: 0.001% to 0.05%, with a remainder being Fe and inevitable impurities, wherein the alloying element-saving hot rolled duplex stainless steel material is produced by hot rolling, a chromium nitride precipitation temperature TN, which is an index regarding precipitation of chromium nitrides during the hot rolling, is in a range of 960° C. or lower, a yield strength is 50 MPa or more higher than that of a hot rolled steel material which is subjected to a solution heat treatment, and the alloying element-saving hot rolled duplex stainless steel material is as hot rolled state, and is not subjected to a solution heat treatment.

(2) There is provided an alloying element-saving hot rolled duplex stainless steel material which includes, by mass %: C: 0.03% or less; Si: 0.05% to 1.0%; Mn: 0.5% to 7.0%; P: 0.05% or less; S: 0.010% or less; Ni: 0.1% to 5.0%; Cr: 18.0% to 25.0%; N: 0.05% to 0.30%; and Al: 0.001% to 0.05%, and further includes one or more selected from: V: 0.05% to 0.5%; Nb: 0.01% to 0.20%; and Ti: 0.003% to 0.05%, with a remainder being Fe and inevitable impurities, wherein the alloying element-saving hot rolled duplex stainless steel material is produced by hot rolling, a chromium nitride precipitation temperature TN2, which is a second index regarding precipitation of chromium nitrides during the hot rolling, is in a range of 960° C. or lower, a yield strength is 50 MPa or more higher than that of a hot rolled steel material which is subjected to a solution heat treatment, and the alloying element-saving hot rolled duplex stainless steel material is as hot rolled state, and is not subjected to a solution heat treatment.

(3) The alloying element-saving hot rolled duplex stainless steel material according to the above (1) or (2), which further includes one or more selected from: Mo: 1.5% or less; Cu: 2.0% or less; W: 1.0% or less; and Co: 2.0% or less.

(4) The alloying element-saving hot rolled duplex stainless steel material according to any one of the above (1) to (3), which further includes one or more selected from: B: 0.0050% or less; Ca: 0.0050% or less; Mg: 0.0030% or less; and REM: 0.10% or less.

(5) There is provided a method for producing the alloying element-saving hot rolled duplex stainless steel material according to any one of the above (1) to (4), which includes: subjecting a billet having the chemical composition according to any one of claims 1 to 4 to hot rolling; and subsequently cooling a hot rolled steel material, wherein in the case where V, Nb and Ti, which are selective components, are not contained, an input side temperature TF of a final finishing rolling pass of the hot rolling is adjusted so as to fulfill the following formula (1), in the case where the above-mentioned selective components are contained, the input side temperature TF of the final finishing rolling pass of the hot rolling is adjusted so as to fulfill the following formula (2), and the hot rolled steel material is cooled in a temperature range from the input side temperature TF of the final finishing rolling pass of the hot rolling to 600° C. for a time of 5 minutes or less, $$TF \geq TN-30 \tag{1}$$

$$TF \geq TN2-30 \tag{2}.$$

(6) The production method of the alloying element-saving hot rolled duplex stainless steel material according to the above (5), wherein a plate thickness exceeds 20 mm, and in the case where V, Nb and Ti, which are the selective components, are not contained, accelerated cooling is initiated from an accelerated cooling initiation temperature TC after an end of the hot rolling that fulfills the following formula (3), and, in the case where the above mentioned selective components are contained, accelerated cooling is initiated from an accelerated cooling initiation temperature TC after the end of the hot rolling that fulfills the following formula (4), and thereby, the hot rolled steel material is cooled in a temperature range from the input side temperature TF of the final finishing rolling pass of the hot rolling to 600° C. for a time of 5 minutes or less, $$TN-200 \leq TC \leq TN+50 \text{ (here, } TF \geq TC\text{)} \tag{3}$$

$$TN2-200 \leq TC \leq TN2+50 \text{ (here, } TF \geq TC\text{)} \tag{4}.$$

(7) There is provided a clad steel plate which includes: a steel plate of a base metal; and a steel plate of a cladding material joined to either or both of two main surfaces of the steel plate of the base metal by hot rolling, wherein the cladding material consists of a duplex stainless steel, the duplex stainless steel contains, by mass %: C: 0.03% or less; Si: 0.05% to 1.0%; Mn: 0.5% to 7.0%; P: 0.05% or less; S: 0.010% or less; Ni: 0.1% to 5.0%; Cr: 18.0% to 25.0%; N: 0.05% to 0.30%; and Al: 0.001% to 0.05%, with a remainder being Fe and inevitable impurities, and a chromium nitride precipitation temperature TN, which is an index regarding precipitation of chromium nitrides during the hot rolling, is in a range of 800° C. to 970° C.

(8) There is provided a clad steel plate which includes: a steel plate of a base metal; and a steel plate of a cladding material joined to either or both of two main surfaces of the steel plate of the base metal by hot rolling, wherein the cladding material consists of a duplex stainless steel, the duplex stainless steel contains, by mass %: C: 0.03% or less; Si: 0.05% to 1.0%; Mn: 0.5% to 7.0%; P: 0.05% or less; S: 0.010% or less; Ni: 0.1% to 5.0%; Cr: 18.0% to 25.0%; N: 0.05% to 0.30%; and Al: 0.001% to 0.05%, and further contains one or more selected from: V: 0.05% to 0.5%; Nb: 0.01% to 0.20%; and Ti: 0.003% to 0.05%, with a remainder being Fe and inevitable impurities, and a chromium nitride precipitation temperature TN2, which is a second index regarding precipitation of chromium nitrides during the hot rolling, is in a range of 800° C. to 970° C.

(9) The clad steel plate according to the above (7) or (8), wherein the duplex stainless steel further contains one or more selected from: Mo: 1.5% or less; Cu: 2.0% or less; W: 1.0% or less; and Co: 2.0% or less.

(10) The clad steel plate according to any one of the above (7) to (9), wherein the duplex stainless steel further contains one or more selected from: B: 0.0050% or less; Ca: 0.0050% or less; Mg: 0.0030% or less; and REM: 0.10% or less.

(11) There is provided a method for producing the clad steel plate according to any one of the above (7) to (10), which includes: joining a steel plate of a base metal and a steel plate of a cladding material having a chemical component according to any one of claims 7 to 10 by hot rolling; and subsequently conducting cooling, wherein in the case where the cladding material does not contain V, Nb and Ti, which are selective components, an input side temperature TF of a final finishing rolling pass of the hot rolling is adjusted so as to fulfill the following formula (5), in the case where the cladding material contains the above mentioned selective components, the input side temperature TF of the final finishing rolling pass of the hot rolling is adjusted so as to fulfill the following formula (6), and the plates are cooled in a temperature range from the input side temperature TF of the final finishing rolling pass of the hot rolling to 600° C. for a time of 5 minutes or less, $$TF \geq TN-100 \quad (5)$$

$$TF \geq TN2-100 \quad (6).$$

(12) The production method of the clad steel plate using the duplex stainless steel as the cladding material according to the above (11), wherein, in the case where the cladding material does not contain V, Nb and Ti, which are selective components, accelerated cooling is initiated from an accelerated cooling initiation temperature TC after an end of the hot rolling that fulfills the following formula (7), and, in the case where the cladding material contains the selective components, accelerated cooling is initiated from an accelerated cooling initiation temperature TC after the end of the hot rolling that fulfills the following formula (8), and thereby, the plates are cooled in the temperature range from the input side temperature TF of the final finishing rolling pass of the hot rolling to 600° C. for a time of 5 minutes or less, $$TC \geq TN-250 \text{ (here, } TF \geq TC\text{)} \quad (7)$$

$$TC \geq TN2-250 \text{ (here, } TF \geq TC\text{)} \quad (8).$$

Effects of the Invention

An aspect of the alloying element-saving hot rolled duplex stainless steel material of the invention can be made to be thinner than a steel material of the related art, and can be used for seawater desalination instruments, tanks in a shipping vessel, a variety of containers and the like. Furthermore, the alloying element-saving hot rolled duplex stainless steel material can be manufactured at a low cost, and the amount of energy used for the manufacturing is small.

An aspect of the clad steel plate of the invention can save alloying elements more than a clad steel plate of the related art, and can be used for seawater desalination instruments, tanks in a shipping vessel, a variety of containers and the like. Furthermore, the clad steel plate can be manufactured at a low cost, and the amount of energy used for the manufacturing is small.

Therefore, the aspect of the alloying element-saving hot rolled duplex stainless steel material and the aspect of the clad steel plate can make an extremely significant contribution in the industry and the environment.

BEST MODE FOR CARRYING OUT THE INVENTION

First Embodiment Regarding the Alloying Element-Saving Hot Rolled Duplex Stainless Steel Material Hereinafter, the unit "%" that indicates the content represents mass %.

A first embodiment of the alloying element-saving hot rolled duplex stainless steel material contains C, Si, Mn, P, S, Ni, Cr, N and Al with a remainder being Fe and inevitable impurities.

In order to secure corrosion resistance of the stainless steel, the content of C is limited to be in a range of 0.03% or less. In the case where the content of C exceeds 0.03%, Cr carbides are generated during hot rolling; and thereby, corrosion resistance and toughness deteriorate.

Si is added at a content of 0.05% or more for deoxidization. However, in the case where the content of Si exceeds 1.0%, toughness deteriorates. Therefore, the upper limit of the content of Si is limited to 1.0%. The content of Si is preferably in a range of 0.2% to 0.7%.

Mn has an effect of improving toughness by increasing an amount of an austenite phase. In addition, Mn also has an effect of decreasing a chromium nitride precipitation temperature TN. Therefore, it is preferable to add Mn actively. Mn is added at a content of 0.5% or more for the toughness of a base metal and a welded joint. However, in the case where the content of Mn exceeds 7.0%, corrosion resistance and toughness deteriorate. Therefore, the upper limit of the content of Mn is limited to 7.0%. The content of Mn is preferably in a range of 1.0% to 6.0%, and more preferably in a range of 2.0% to 5.0%.

P is an element that is inevitably incorporated from a raw material, and P deteriorates hot workability and toughness. Therefore, the content of P is limited to be in a range of 0.05% or less. The content of P is preferably in a range of 0.03% or less.

S is an element that is inevitably incorporated from the raw material, and S deteriorates hot workability, toughness and corrosion resistance. Therefore, the content of S is limited to be in a range of 0.010% or less. The content of S is preferably in a range of 0.0020% or less.

Ni stabilizes an austenite structure, and Ni improves corrosion resistance with respect to a variety of acids, and furthermore, Ni improves toughness. Therefore, Ni is contained at a content of 0.1% or more. It becomes possible to decrease a nitride precipitation temperature by increasing the content of Ni. On the other hand, since Ni is an expensive alloy, and the subject of the present embodiment is an alloying element-saving duplex stainless steel, the content of Ni is limited to be in a range of 5.0% or less from the viewpoint of costs. The content of Ni is preferably in a range of 1.0% to 4.0%, and more preferably in a range of 1.5% to 3.0%.

In order to secure basic corrosion resistance, Cr is contained at a content of 18.0% or more. On the other hand, in the case where the content of Cr exceeds 25.0%, a fraction of a ferrite phase increases, and toughness and corrosion resistance of a welded joint are impaired. Therefore, the content of Cr is set to be in a range of 18.0% to 25.0%. The content of Cr is preferably in a range of 19.0% to 23.0%.

N is an effective element for enhancing strength and corrosion resistance by being solid-solubilized (dissolved) in an austenite phase. Therefore, N is contained at a content of 0.05% or more. The solid solution limit increases in proportion to the content of Cr. However, in the steel material of the embodiment, in the case where the content of N exceeds 0.30%, Cr nitrides are precipitated; and thereby, toughness and corrosion resistance are impaired. Therefore, the upper limit of the content of N is set to 0.30%. The content of N is preferably in a range of 0.10% to 0.25%.

Al is an important element for the deoxidization of a steel, and Al is contained together with Si in order to reduce a content of oxygen in the steel. In the case where the content of Si exceeds 0.3%, there are cases in which Al does not need to be added. However, the reduction of the content of oxygen is essential for securing toughness. Therefore, Al needs to be contained at a content of 0.001% or more. Meanwhile, Al is an element having a relatively large affinity to N. Therefore, in the case where an excessive amount of Al is added, AN is generated, and toughness of the stainless steel is impaired. The degree of the degradation of the toughness also depends on the content of N; however, in the case where the content of Al exceeds 0.05%, the toughness greatly degrades. Therefore, the upper limit of the content of Al is set to 0.05%. The content of Al is preferably in a range of 0.03% or less.

O is an inevitable impurity, and the upper limit of the content of O is not particularly specified. However, O is an important element configuring oxides, which are typical non-metallic inclusions. Therefore, in the case where an excessive amount of O is contained, toughness is impaired. In addition, in the case where coarse cluster-shaped dispersed oxides are generated, surface defects are caused. Therefore, the content of O is preferably in a range of 0.010% or less.

The steel material of the embodiment is produced by hot rolling, and a chromium nitride precipitation temperature TN, which is an index regarding precipitation of chromium nitrides during the hot rolling, is in a range of 960° C. or lower.

The chromium nitride precipitation temperature TN is a characteristic value experimentally obtained using the method described below. At first, the steel material that has been subjected to a solution heat treatment is subjected to soaking at a temperature of 800° C. to 1000° C. for 20 minutes, and then water cooling is conducted after a time of 5 seconds or less is passed. Next, a precipitation amount (Cr residue amount) of the chromium nitrides in the cooled steel material is measured by the electroextraction residue analyzing method of non-metallic inclusions, which will be described in detail in the examples. Among the soaking temperatures at which the Cr residue amount becomes in a range of 0.01% or less, the lowest temperature is used as the chromium nitride precipitation temperature TN.

As the chromium nitride precipitation temperature TN decreases, a temperature range, in which the chromium nitrides are precipitated, is limited to the low-temperature side. Thereby, a precipitation rate or a precipitation amount of the chromium nitrides is suppressed. Therefore, impact property and corrosion resistance are maintained in a state in which the steel material is as hot rolled state and is not subjected to the solution heat treatment.

Here, the reason why the soaking temperature for obtaining the chromium nitride precipitation temperature TN is limited to be in a range of 800° C. to 1000° C. is to understand the precipitation behaviors in the ordinary temperature range of hot rolling. In the embodiment, the soaking temperature is regulated to be in the above-described temperature range in order to prevent the precipitation of the chromium nitrides during the hot rolling which is ordinarily carried out.

In addition, the soaking is carried out for 20 minutes in consideration of the time necessary for the generation reaction of the chromium nitrides to sufficiently reach the equilibrium state. In the case where the soaking time is less than 20 minutes, the precipitation amount changes greatly, and it is difficult to obtain reproducibility of a measured value. In the case where the soaking time exceeds 20 minutes, a long period of time is required for measurement. Therefore, the soaking may be carried out for more than 20 minutes from the viewpoint of securing the reproducibility by allowing the generation reaction of the chromium nitrides to sufficiently reach the equilibrium state.

In the case where a long period of time is required from the soaking to the water cooling, the temperature of the steel material gradually decreases such that the chromium nitrides are precipitated. In this case, a value different from the amount of the chromium nitrides at the soaking temperature, which is supposed to be measured, is obtained. Therefore, the steel material is subjected to the water cooling within 5 seconds from the soaking.

In addition, the reason why the lowest temperature among the temperatures at which the Cr residue amount becomes in a range of 0.01% or less is defined as the chromium nitride precipitation temperature TN is as follows. It was experimentally confirmed that the Cr residue amount of 0.01% or less is the precipitation amount at which corrosion resistance or toughness is not adversely influenced.

With regard to the alloying element-saving hot rolled duplex stainless steel material which is as hot rolled state and is not subjected to a solution heat treatment, it was experimentally obtained that, in order to secure corrosion resistance and toughness, it is necessary to adjust the composition so that TN becomes in a range of 960° C. or lower. Therefore, it is necessary to adjust the component composition so that TN becomes in a range of 960° C. or lower. In the case where TN exceeds 960° C., the chromium nitrides are precipitated during the hot rolling, and pitting potential difference and impact property deteriorate. TN is preferably in a range of 930° C. or lower.

In addition, TN is decreased by decreasing the content of N. However, the steel material of the embodiment contains 0.05% or more of N in order to enhance the corrosion resistance, and, in this case, it is difficult to set TN to be in a range of lower than 800° C. Therefore, the lower limit of TN is preferably set to 800° C.

Meanwhile, the reduction of the content of N is effective for lowering TN, but an extreme reduction of the content of N leads to a decrease in a proportion of an austenite phase and a degradation of the corrosion resistance of a welded joint. Therefore, it is necessary to appropriately adjust the contents of Ni, Mn and Cu, which are elements that generate the austenite phase, together with the content of N.

The alloying element-saving hot rolled duplex stainless steel material of the embodiment is as hot rolled state and is not subjected to a solution heat treatment. A yield strength of the steel material of the embodiment is 50 MPa or more higher than a yield strength of a hot-rolled steel material which is subjected to a solution heat treatment. Generally, when the steel material is subjected to a solution heat treatment, the strength decreases. In the embodiment, strain is allowed to remain in a state in which the steel material is as hot rolled state; and thereby, a high strength is obtained. That is, since the steel metal is not subjected to a solution heat treatment, the strength does not decrease. Generally, in the case where a finishing temperature of rolling is set to a high temperature so as to approximate a temperature of a solution heat treatment, the strength decreases. In the steel material of the embodiment, the finishing temperature of rolling is decreased as described below; and thereby, the precipitation temperature of the chromium nitrides is decreased so as to enable an increase in the strength. As a result, a high strength can be easily obtained.

Second Embodiment Regarding the Alloying Element-Saving Hot Rolled Duplex Stainless Steel Material A second embodiment of the alloying element-saving hot rolled duplex stainless steel material contains C, Si, Mn, P, S, Ni, Cr, N and Al, and further contains one or more selected from V, Nb and Ti with a remainder being Fe and inevitable impurities.

The inventors found that, in the case where a steel contains one or more selected from V, Nb and Ti, the steel exhibits different behaviors from the knowledge of the related art.

That is, it was a general knowledge of the related art that corrosion resistance deteriorated as the amount of chromium nitrides increased. However, it became clear that, in the case where a steel contains a small amount of V, Nb and Ti, unexpectedly, there is a tendency for corrosion resistance to be improved even when the precipitation amount of the chromium nitrides increases to some extent.

As described above, in the case where a steel contains a small amount of V, Nb and Ti, an allowable amount of the chromium nitrides increases. Therefore, with regard to a steel material containing V, Nb and Ti, which are selective components, a chromium nitride precipitation temperature TN2 is newly defined as a second index regarding the precipitation of the chromium nitrides during hot rolling. The chromium nitride precipitation temperature TN2 is experimentally obtained using the method described below. Similarly to the case of the chromium nitride precipitation temperature TN, at first, the steel material that has been subjected to the solution heat treatment is subjected to soaking at a temperature of 800° C. to 1000° C. for 20 minutes, and then water cooling is conducted after a time of 5 seconds or less is passed. Next, a precipitation amount (Cr residue amount) of the chromium nitrides in the cooled steel material is measured by the electroextraction residue analyzing method of non-metallic inclusions, which will be described in detail in the examples. Unlike the case of the chromium nitride precipitation temperature TN, among the soaking temperatures at which the Cr residue amount becomes in a range of 0.03% or less, the lowest temperature is used as the chromium nitride precipitation temperature TN2.

Meanwhile, it is needless to say that the chromium nitride precipitation temperature TN, which has been described in the first embodiment of the alloying element-saving hot rolled duplex stainless steel material, is an index regarding the precipitation of the chromium nitrides during hot rolling in a steel material that does not contain V, Nb and Ti, which are selective components.

In the second embodiment of the alloying element-saving hot rolled duplex stainless steel material, the amount of the Cr nitrides is mitigated, and the problem of the invention can be solved as long as TN2 is in a range of 960° C. or lower. TN2 is preferably in a range of 930° C. or lower. In addition, a method for experimentally obtaining TN2 and a method for decreasing TN2 are the same as for TN. Meanwhile, the reason why the lowest temperature is defined as TN2 among the temperatures at which the Cr residue amount becomes in a range of 0.03% or less is as follows. It was experimentally confirmed that, in the case where the precipitation amount of the chromium nitrides (Cr residue amount) is in a range of 0.03% or less, the precipitation amount of the chromium nitrides has no adverse influence on corrosion resistance or toughness.

The chromium nitride precipitation temperature TN2 is decreased by decreasing the concentration of chromium and the concentration of nitrogen. However, the chromium nitride precipitation temperature TN2 can be decreased by adding an austenite-stabilizing element. In the second embodiment of the alloying element-saving hot rolled duplex stainless steel material, the precipitation of the chromium nitrides is controlled by containing a small amount of V, Nb and Ti, which are stronger nitrogen-generating elements than chromium; and thereby, the corrosion resistance of the hot rolled steel material is improved.

That is, the following facts became clear in the studies by the inventors. In the case where a small amount of V, Nb and Ti are added to the alloying element-saving duplex stainless steel, nitrides are generated, and in the nitrides, some chromium is substituted by V, Nb or Ti. Thereby, the precipitation temperature of the nitrides slightly increases; however, unexpectedly, there is a tendency that corrosion resistance is improved even when the precipitation amount of the chromium nitrides increases. In the second embodiment of the alloying element-saving hot rolled duplex stainless steel material, the effect obtained by adding a small amount of the above-described additive elements was also disclosed as the invention.

Nitrides or carbides, which are formed by V, are generated during hot working and a cooling step of the steel material, and these nitrides and carbides have an action of enhancing corrosion resistance. The reason is not sufficiently confirmed; however, a possibility is considered that the nitrides and the carbides suppress a generation rate of chromium nitrides at a temperature of 700° C. or lower. In order for the improvement of the corrosion resistance, V may be contained at a content of 0.05% or more. In the case where the content of V exceeds 0.5%, coarse V-based carbonitrides are generated, and toughness deteriorates. Therefore, the upper limit of the content of V is limited to 0.5%. In the case where V is added, the content of V is preferably in a range of 0.1% to 0.3%.

Nitrides or carbides, which are formed by Nb, are generated during hot working and a cooling step of the steel material, and these nitrides and carbides have an action of enhancing corrosion resistance. The reason is not sufficiently confirmed; however, a possibility is considered that the nitrides and the carbides suppress a generation rate of the chromium nitrides at a temperature of 700° C. or lower. In order for the improvement of the corrosion resistance, Nb may be contained at a content of 0.01% or more. On the other hand, in the case where an excessive amount of Nb is added, Nb is precipitated as insoluble precipitates during heating before the hot rolling; and thereby, toughness is impaired. Therefore, the upper limit of the content of Nb is specified to 0.20%. In the case where Nb is added, the content of Nb is preferably in a range of 0.03% to 0.10%.

An extremely small amount of Ti forms oxides, nitrides or sulfides, and Ti is an element that miniaturizes crystal grains in a solidified and high-temperature-heated structure of a steel. In addition, similarly to V and Nb, Ti also has a property of substituting some chromium in the chromium nitrides. In the case where Ti is contained at a content of 0.003% or more, precipitates of Ti are formed. On the other hand, in the case where more than 0.05% of Ti is contained in the duplex stainless steel, coarse TiN is generated; and thereby, toughness of the steel is impaired. Therefore, the upper limit of the content of Ti is specified to 0.05%. The content of Ti is preferably in a range of 0.005% to 0.020%.

Meanwhile, since contents and effects of C, Si, Mn, P, S, Ni, Cr, N and Al in the second embodiment of the alloying element-saving hot rolled duplex stainless steel material are the same as those in the first embodiment of the alloying element-saving hot rolled duplex stainless steel material, the contents and the effects will not be described.

(Preferable Aspects of the First and Second Embodiments Regarding the Alloying Element-Saving Hot Rolled Duplex Stainless Steel Material)

The steel material may further contain one or more selected from Mo, Cu, W and Co, which are selective elements, in order to additionally enhance corrosion resistance.

Mo is an extremely effective element for additionally enhance the corrosion resistance of the stainless steel, and Mo may be contained as necessary. Mo is preferably contained at a content of 0.2% or more for the improvement of the corrosion resistance. On the other hand, since Mo is an element that accelerates precipitation of intermetallic compounds, and the upper limit of the content of Mo is set to 1.5% from the viewpoint of suppressing the precipitation during hot rolling.

Cu is an element that additionally enhances corrosion resistance of the stainless steel with respect to acids, and Cu also has an action of improving toughness. Therefore, Cu is recommended to be contained at a content of 0.3% or more. In the case where the content of Cu exceeds 2.0%, the content of Cu exceeds the solid solubility during hot rolling such that εCu precipitates and embrittlement occurs. Therefore, the upper limit of the content of Cu is set to 2.0%. In the case where Cu is contained, the content of Cu is preferably in a range of 0.3% to 1.5%.

Similarly to Mo, W is an element that additionally improves corrosion resistance of the stainless steel. For the purpose of enhancing the corrosion resistance, the upper limit of the content of W is set to 1.0%. The content of W is preferably in a range of 0.05% to 0.5%.

Co is an effective element for enhancing toughness and corrosion resistance of the steel, and Co is selectively added. The content of Co is preferably in a range of 0.03% or more. In the case where the content of Co exceeds 2.0%, a cost-effective effect is not exhibited because Co is an expensive element. Therefore, the upper limit of the content of Co is specified to 2.0%. In the case where Co is added, the content of Co is preferably in a range of 0.03% to 1.0%.

In order to improve hot workability, the steel material may selectively contain one or more selected from B, Ca, Mg and REM as necessary. All of B, Ca, Mg and REM are elements that improve hot workability of the steel, and one or more thereof may be contained for the purpose of improving the hot workability. In the case where excessive amounts of B, Ca, Mg and REM are contained, the hot workability and toughness degrade. Therefore, the upper limits of the contents of B, Ca, Mg and REM are specified as follows.

The upper limit of the content of B and the upper limit of the content of Ca are set to 0.0050%. The upper limit of the content of Mg is set to 0.0030%. The upper limit of the content of REM is set to 0.10%. The preferable contents are B: 0.0005% to 0.0030%, Ca: 0.0005% to 0.0030%, Mg: 0.0001% to 0.0015% and REM: 0.005% to 0.05%, respectively. Here, REM refers to rare earth metals, and REM is one or more selected from Sc, Y, La, Ce, Pr, Nd, Pm, Sm Eu, Gd, Tb, Dy, Ho, Er, Tm, Yb and Lu. The content of REM is the sum of the contents of the above-described elements.

(Method for Producing the Alloying Element-Saving Hot Rolled Duplex Stainless Steel Material)

The method for producing the alloying element-saving hot rolled duplex stainless steel material includes: a step of hot-rolling a billet; and a step of subsequently cooling the hot rolled steel material. The billet has the chemical composition described in the first and second embodiments of the alloying element-saving hot rolled duplex stainless steel material described above.

An input side temperature TF of a final finishing rolling pass of the hot rolling is an important factor that dominates the strength of the hot rolled steel material, and a higher strength is obtained as TF decreases. On the other hand, in the case where TF is excessively decreased, a precipitation amount of chromium nitrides during the hot rolling increases; and thereby, toughness and corrosion resistance are impaired. In addition, in the case where TF is too high, no difference is made from the case of a steel material that is subjected to a solution heat treatment, and the strength decreases. Therefore, the object of the embodiment of removing the solution heat treatment cannot be achieved.

In the experiment of the inventors, in the case where TF was lower than the chromium nitride precipitation temperature by more than 30° C., toughness and corrosion resistance degraded beyond acceptable values. Therefore, the lower limit of TF is specified to {(chromium nitride precipitation temperature)−30}(° C.).

That is, in the case where the steel material does not contain V, Nb and Ti which are selective elements, the input side temperature TF of the final finishing rolling pass of the hot rolling is adjusted so as to fulfill the following formula (1). In the case where the steel material contains the above-described selective components, the input side temperature TF of the final finishing rolling pass of the hot rolling is adjusted so as to fulfill the following formula (2).

$$TF \geq TN-30 \quad (1)$$

$$TF \geq TN2-30 \quad (2)$$

In addition, the upper limit of TF is not particularly specified. However, it is necessary to set TF to be in a range of lower than 1000° C. in order to obtain an alloying element-saving hot rolled duplex stainless steel material which has an yield strength of 50 MPa or more higher than that of a hot rolled steel material which is subjected to a solution heat treatment, and the alloying element-saving hot rolled duplex stainless steel material is as hot rolled state, and is not subjected to a solution heat treatment. A temperature of the solution heat treatment depends on a composition of a steel to some extent; however, in the case of the composition of the embodiment, the solution heat treatment can be carried out by holding the steel material at a temperature of 950° C. to 1050° C. for 5 minutes. Therefore, the hot rolled steel material of the related art, which is subjected to the solution heat treatment, is manufactured by carrying out the solution heat treatment at 1000° C. for 5 minutes. Then, comparison is made with a yield strength of this hot rolled steel material of the related art.

During the cooling in the temperature range from TF to 600° C., precipitation of chromium nitrides proceeds. In order to suppress the precipitation, it is necessary to rapidly cool the steel material. A precipitation rate of the chromium nitrides increases as the chromium nitride precipitation temperature of the steel increases. In the embodiment in which the chromium nitride precipitation temperature is limited to be in a range of 960° C. or lower, in the case where a cooling time from TF to 600° C. exceeds 5 minutes, a precipitation amount of the chromium nitrides increases, and toughness and corrosion resistance are impaired.

Therefore, in the method for producing the alloying element-saving hot rolled duplex stainless steel material according to the embodiment, the steel material is cooled in the temperature range from the input side temperature TF of the final finishing rolling pass of the hot rolling to 600° C. for a time of 5 minutes or less. As long as the steel material has a plate thickness of 20 mm or less, the above-described limit can be almost fulfilled by air-cooling the steel material.

In the method for producing the alloying element-saving hot rolled duplex stainless steel material according to the embodiment, a preferable aspect of accelerated cooling after the end of the hot rolling will be described below.

The accelerated cooling after the end of the hot rolling is carried out in order to suppress precipitation of chromium nitrides in the steel material after the end of the rolling. The precipitation in the steel material after the hot rolling proceeds in a supercooled state, and a precipitation rate exhibits the maximum value in a temperature range of 600° C. to 800° C. The maximum value increases with a degree of supercooling from the chromium nitride precipitation temperature. Therefore, it is necessary to cool immediately after finishing rolling.

Therefore, it is preferable that the steel material having a plate thickness of more than 20 mm is subjected to accelerated cooling. Based on the experimental results by the inventors, it is preferable that an accelerated cooling initiation temperature TC is set to be in a range of {(chromium nitride precipitation temperature)−200}(° C.) or higher.

That is, in the case where the steel material does not contain V, Nb and Ti which are selective components, and the steel material has a plate thickness of more than 20 mm, the accelerated cooling is initiated from the accelerated cooling initiation temperature TC that fulfills the following formula (3). In the case where the steel material contains the above-described selective components, and the steel material has a plate thickness of more than 20 mm, the accelerated cooling is initiated from the accelerated cooling initiation temperature TC that fulfills the following formula (4).

$$TN-200 \leq TC \leq TN+50 \text{ (here, } TF \geq TC) \quad (3)$$

$$TN2-200 \leq TC \leq TN2+50 \text{ (here, } TF \geq TC) \quad (4)$$

In addition, in the method for producing the alloying element-saving hot rolled duplex stainless steel material having a plate thickness of more than 20 mm, the accelerated cooling is initiated from the accelerated cooling initiation temperature TC after the end of the hot rolling; and thereby, the steel material is cooled in the temperature range from the input side temperature TF of the final finishing rolling pass of the hot rolling to 600° C. for a time of 5 minutes or less.

Meanwhile, the object of the embodiment is, definitely, to suppress the precipitation of the chromium nitrides by cooling the steel material for 5 minutes or less in the temperature range from TF to 600° C.; and thereby, an alloying element-saving hot rolled duplex stainless steel material is obtained that is excellent in terms of toughness and corrosion resistance. Therefore, not only for the steel material having a plate thickness of 20 mm or less but also for the steel material having a plate thickness of more than 20 mm, it is not always true that accelerated cooling is necessary as long as the steel material can be cooled in the temperature range from TF to 600° C. for 5 minutes or less. For example, in the case where the steel material can be cooled in the temperature range from TF to 600° C. for a time of 5 minutes or less through air cooling or cooling in the air, it is not necessarily required to carry out accelerated cooling. The purport for carrying out the accelerated cooling in the middle of the cooling from TF or simultaneously with the initiation of the cooling from TF is as follows. Since there are cases in which the steel material having a plate thickness of more than 20 mm cannot be cooled from TF to 600° C. for 5 minutes or less, the accelerated cooling is determined to be initiated from TC which is the optimal temperature in order to avoid the above-described cases.

In addition, in the case where the accelerated cooling initiation temperature TC is extremely increased, there are cases in which corrosion resistance degrades. Therefore, the upper limit of TC is set to be in a range of {(chromium nitride precipitation temperature)+50}(° C.) or lower. TC is preferably set to be in a range of {(chromium nitride precipitation temperature)−150}(° C.) to the chromium nitride precipitation temperature.

Meanwhile, it is reasonable to use water or a gas-water mixture (a mixture of gas and water) as a medium for the accelerated cooling from the viewpoint of facility costs.

First Embodiment Regarding the Clad Steel Plate

A first embodiment regarding the clad steel plate includes: a steel plate of a base metal; and a steel plate of a cladding material joined to either or both of two main surfaces of the steel plate of the base metal. The cladding material consists of a duplex stainless steel, and the duplex stainless steel contains C, Si, Mn, P, S, Ni, Cr, N and Al with a remainder being Fe and inevitable impurities.

In order to secure corrosion resistance of the stainless steel, the content of C is limited to be in a range of 0.03% or less. In the case where the content of C exceeds 0.03%, Cr carbides are generated during hot rolling; and thereby, corrosion resistance and toughness deteriorate.

Si is added at a content of 0.05% or more for deoxidization. However, in the case where the content of Si exceeds 1.0%, toughness deteriorates. Therefore, the upper limit of the content of Si is limited to 1.0%. The content of Si is preferably in a range of 0.2% to 0.7%.

Mn has an effect of improving toughness by increasing an amount of an austenite phase. Mn is added at a content of 0.5% or more for the toughness of the base metal and a welded joint. In addition, Mn has an effect of decreasing the nitride precipitation temperature TN. Therefore, it is preferable that Mn is actively added. However, in the case where the content of Mn exceeds 7.0%, corrosion resistance and toughness deteriorate. Therefore, the upper limit of the content of Mn is limited to 7.0%. The content of Mn is preferably in a range of 1.0% to 6.0%, and more preferably in a range of 2.0% to 5.0%.

P is an element that is inevitably incorporated from a raw material, and P deteriorates hot workability and toughness.

Therefore, the content of P is limited to be in a range of 0.05% or less. The content of P is preferably in a range of 0.03% or less.

S is an element that is inevitably incorporated from the raw material, and S deteriorates hot workability, toughness and corrosion resistance. Therefore, the content of S is limited to be in a range of 0.010% or less. The content of S is preferably in a range of 0.0020% or less.

Ni stabilizes an austenite structure, and Ni improves corrosion resistance with respect to a variety of acids and, furthermore, Ni improves toughness. Therefore, Ni is contained at a content of 0.1% or more. It becomes possible to decrease a nitride precipitation temperature by increasing the content of Ni. On the other hand, since Ni is an expensive alloy, and the present embodiment has the alloying element-saving duplex stainless steel as a cladding material, the content of Ni is limited to be in a range of 5.0% or less from the viewpoint of costs. The content of Ni is preferably in a range of 1.0% to 4.0%, and more preferably in a range of 1.5% to 3.0%.

In order to secure basic corrosion resistance, Cr is contained at a content of 18.0% or more. On the other hand, in the case where the content of Cr exceeds 25.0%, a fraction of a ferrite phase increases, and toughness and the corrosion resistance of a welded joint are impaired. Therefore, the content of Cr is set to be in a range of 18.0% to 25.0%. The content of Cr is preferably in a range of 19.0% to 23.0%.

N is an effective element for enhancing strength and corrosion resistance by being solid-solubilized (dissolved) in an austenite phase. Therefore, N is contained at a content of 0.05% or more. The solid solution limit increases in proportion to the content of Cr. However, in the steel material of the embodiment, in the case where the content of N exceeds 0.30%, Cr nitrides are precipitated; and thereby, toughness and corrosion resistance are impaired. Therefore, the upper limit of the content of N is set to 0.30%. The content of N is preferably in a range of 0.10% to 0.25%.

Al is an important element for the deoxidization of a steel, and Al is contained together with Si in order to reduce a content of oxygen in the steel. In the case where the content of Si exceeds 0.3%, there are cases in which Al does not need to be added. However, the reduction of the content of oxygen is essential for securing toughness. Therefore, Al needs to be contained at a content of 0.001% or more. Meanwhile, Al is an element having a relatively large affinity to N. Therefore, in the case where an excessive amount of Al is added, AlN is generated, and toughness of the stainless steel is impaired. The degree of the degradation of the toughness also depends on the content of N; however, in the case where the content of Al exceeds 0.05%, the toughness greatly degrades. Therefore, the upper limit of the content of Al is set to 0.05%. The content of Al is preferably in a range of 0.03% or less.

O is an inevitable impurity, and the upper limit of the content of O is not particularly specified. However, O is an important element configuring oxides, which are typical non-metallic inclusions. Therefore, in the case where an excessive amount of O is contained, toughness is impaired. In addition, in the case where coarse cluster-shaped dispersed oxides are generated, surface defects are caused. Therefore, the content of O is preferably in a range of 0.010% or less.

A steel plate of a base metal and a steel plate of a cladding material are joined by hot rolling, and a chromium nitride precipitation temperature TN, which is an index regarding precipitation of chromium nitrides during the hot rolling, is in a range of 800° C. to 970° C.

The chromium nitride precipitation temperature TN is a characteristic value experimentally obtained using the method described below. At first, the steel material that has been subjected to the solution heat treatment is subjected to soaking at a temperature of 800° C. to 1000° C. for 20 minutes, and then water cooling is conducted after a time of 5 seconds or less is passed. Next, a precipitation amount (Cr residue amount) of the chromium nitrides in the cooled steel material is measured by the electroextraction residue analyzing method of non-metallic inclusions, which will be described in detail in the examples. Among the soaking temperatures at which the Cr residue amount becomes in a range of 0.01% or less, the lowest temperature is used as the chromium nitride precipitation temperature TN.

As the chromium nitride precipitation temperature TN decreases, a temperature range, in which the chromium nitrides are precipitated, is limited to the low-temperature side. Thereby, a precipitation rate or a precipitation amount of the chromium nitrides is suppressed. Therefore, corrosion resistance of the cladding material is maintained in a state in which the steel material is as hot rolled state and is not subjected to the solution heat treatment.

Here, the reason why the soaking temperature is limited to be in a range of 800° C. to 1000° C. is that this temperature range is an ordinary temperature range of hot rolling. In the embodiment, the soaking temperature is regulated to be in the above-described temperature range in order to prevent the precipitation of the chromium nitrides during the hot rolling which is ordinarily carried out.

In addition, the soaking is carried out for 20 minutes in consideration of the time necessary for the generation reaction of the chromium nitrides to sufficiently reach the equilibrium state. In the case where the soaking time is less than 20 minutes, the precipitation amount changes greatly, and it is difficult to obtain reproducibility of a measured value. In the case where the soaking time exceeds 20 minutes, a long period of time is required for measurement. Therefore, the soaking may be carried out for more than 20 minutes from the viewpoint of securing the reproducibility by allowing the generation reaction of the chromium nitrides to sufficiently reach the equilibrium state.

In the case where a long period of time is required from the soaking to the water cooling, the temperature of the steel material gradually decreases such that the chromium nitrides are precipitated. In this case, a value different from the amount of the chromium nitrides at the soaking temperature, which is supposed to be measured, is obtained. Therefore, the steel material is subjected to the water cooling within 5 seconds from the soaking.

In addition, the reason why the lowest temperature among the temperatures at which the Cr residue amount becomes in a range of 0.01% or less is defined as the chromium nitride precipitation temperature TN is as follows. It was experimentally confirmed that the Cr residue amount of 0.01% or less is the precipitation amount at which corrosion resistance or toughness is not adversely influenced.

With regard to the alloying element-saving duplex stainless steel material which is as hot rolled state and is not subjected to a solution heat treatment, it was experimentally obtained that, in order to secure corrosion resistance and toughness, it is necessary to adjust the composition so that TN becomes in a range of 970° C. or lower. Therefore, it is necessary to adjust the component composition so that TN becomes in a range of 970° C. or lower. TN is preferably in a range of 930° C. or lower.

In addition, TN is decreased by decreasing the content of N. However, the steel material of the embodiment contains 0.05% or more of N in order to enhance the corrosion resistance, and, in this case, it is difficult to set TN to be in a range of lower than 800° C. Therefore, the lower limit of TN is preferably set to 800° C.

Meanwhile, the reduction of the content of N is effective in lowering TN, but an extreme reduction of the content of N leads to a decrease in a proportion of an austenite phase and a degradation of the corrosion resistance of a welded joint. Therefore, it is necessary to appropriately adjust the contents of Ni, Mn and Cu, which are elements that generate the austenite phase, together with the content of N.

In the clad steel material of the embodiment, the chromium nitride precipitation temperature of the duplex stainless steel, which is the cladding material, is limited to be in a range of a specific temperature or lower. Therefore, the base metal of the clad steel plate is not particularly limited, and it is possible to use one or more selected from a group consisting of common steels (carbon steels) and alloy steels excluding stainless steels. The steel plate of the base metal can be appropriately selected and used depending on the intended use.

Examples of the alloy steel include a low-alloy steel, a nickel steel, a manganese steel, a chromium molybdenum steel, a high-speed steel and the like; however, the alloy steel is not limited to the above-described steels, and any steel may be used which is obtained by adding one or more elements to a common steel.

A Second Embodiment Regarding the Clad Steel Plate

A second embodiment regarding the clad steel plate includes: a steel plate of a base metal; and a steel plate of a cladding material joined to either or both of two main surfaces of the steel plate of the base metal. The cladding material consists of a duplex stainless steel, and the duplex stainless steel contains C, Si, Mn, P, S, Ni, Cr, N and Al, and further contains one or more selected from V, Nb and Ti, with a remainder being Fe and inevitable impurities.

The inventors found that, in the case where the clad steel plate includes an alloying element-saving duplex steel containing V, Nb and Ti as the cladding material, the clad steel plate exhibits behaviors different from the knowledge of the related art.

That is, it was found that, in the case where a small amount of V, Nb and Ti are contained in the alloying element-saving duplex stainless steel, nitrides are generated in which some chromium is substituted by V, Nb or Ti, and an amount of the chromium nitrides increases. This means that a chromium nitride precipitation temperature is slightly increased. According to a general knowledge of the related art, it was considered that corrosion resistance deteriorated as the amount of the chromium nitrides increased. However, it became clear that, in the case where a small amount of V, Nb and Ti are contained, unexpectedly, there is a tendency for corrosion resistance to be improved even when the precipitation amount of the chromium nitrides increases.

As described above, in the case where a small amount of V, Nb and Ti are contained, an allowable amount of the chromium nitrides increases. Therefore, with regard to a steel material containing V, Nb and Ti, which are selective components, a chromium nitride precipitation temperature TN2 is newly defined as a second index regarding the precipitation of the chromium nitrides during hot rolling. The chromium nitride precipitation temperature TN2 is experimentally obtained using the method described below. Similarly to the case of the chromium nitride precipitation temperature TN, at first, the steel material that has been subjected to the solution heat treatment is subjected to soaking at a temperature of 800° C. to 1000° C. for 20 minutes, and then water cooling is conducted after a time of 5 seconds or less is passed. Next, a precipitation amount (Cr residue amount) of the chromium nitrides in the cooled steel material is measured by the electroextraction residue analyzing method of non-metallic inclusions, which will be described in detail in the examples. Unlike the case of the chromium nitride precipitation temperature TN, among the soaking temperatures at which the Cr residue amount becomes in a range of 0.03% or less, the lowest temperature is used as the chromium nitride precipitation temperature TN2.

Meanwhile, it is needless to say that the chromium nitride precipitation temperature TN, which has been described in the first embodiment of the clad steel plate, is an index regarding the precipitation of the chromium nitrides during hot rolling in a steel material that does not contain V, Nb and Ti, which are selective components.

In the second embodiment of the clad steel plate, the amount of the Cr nitrides is mitigated, and the problem of the invention can be solved as long as TN2 is in a range of 970° C. or lower. TN2 is preferably in a range of 930° C. or lower. In addition, a method for experimentally obtaining TN2, and a method for decreasing the lower limit of TN2 and TN2 are the same as for TN. Meanwhile, the reason why the lowest temperature is defined as TN2 among the temperatures at which the Cr residue amount becomes in a range of 0.03% or less is as follows. It was experimentally confirmed that, in the case where the precipitation amount of the chromium nitrides (Cr residue amount) is in a range of 0.03% or less, the precipitation amount of the chromium nitrides has no adverse influence on corrosion resistance or toughness.

Nitrides or carbides, which are formed by V, are generated during hot working and a cooling step of the steel material, and these nitrides and carbides have an action of enhancing corrosion resistance. The reason is not sufficiently confirmed; however, a possibility is considered that the nitrides and the carbides suppress a generation rate of chromium nitrides at a temperature of 700° C. or lower. In order for the improvement of the corrosion resistance, V may be contained at a content of 0.05% or more. In the case where the content of V exceeds 0.5%, coarse V-based carbonitrides are generated, and toughness deteriorates. Therefore, the upper limit of the content of V is limited to 0.5%. In the case where V is added, the content of V is preferably in a range of 0.1% to 0.3%.

Nitrides or carbides, which are formed by Nb, are generated during hot working and a cooling step of the steel material, and these nitrides and carbides have an action of enhancing corrosion resistance. The reason is not sufficiently confirmed; however, a possibility is considered that the nitrides and the carbides suppress a generation rate of the chromium nitrides at a temperature of 700° C. or lower. In order for the improvement of the corrosion resistance, Nb may be contained at a content of 0.01% or more. On the other hand, in the case where an excessive amount of Nb is added, Nb is precipitated as insoluble precipitates during heating before the hot rolling; and thereby, toughness is impaired. Therefore, the upper limit of the content of Nb is specified to 0.20%. In the case where Nb is added, the content of Nb is preferably in a range of 0.03% to 0.10%.

An extremely small amount of Ti forms oxides, nitrides or sulfides, and Ti is an element that miniaturizes crystal grains in a solidified and high-temperature-heated structure of a steel. In addition, similarly to V and Nb, Ti also has a property of substituting some chromium in the chromium nitrides. In the case where Ti is contained at a content of 0.003% or more, precipitates of Ti are formed. On the other hand, in the case where more than 0.05% of Ti is contained in the duplex stainless steel, coarse TiN is generated; and thereby, toughness of the steel is impaired. Therefore, the upper limit of the content of Ti is specified to 0.05%. The content of Ti is preferably in a range of 0.005% to 0.020%.

Meanwhile, in the second embodiment of the clad steel plate, since contents and effects of C, Si, Mn, P, S, Ni, Cr, N and Al in the duplex stainless steel of the cladding material and the steel plate of the base metal are the same as those in the first embodiment of the clad steel plate, these will not be described.

(Preferable Aspects of the First and Second Embodiments Regarding the Clad Steel Plate)

The cladding material may further contain one or more selected from Mo, Cu, W and Co, which are selective elements, in order to additionally enhance corrosion resistance of the cladding material.

Mo is an extremely effective element for additionally enhance the corrosion resistance of the stainless steel, and Mo may be contained as necessary. Mo is preferably contained at a content of 0.2% or more for the improvement of the corrosion resistance. On the other hand, since Mo is an element that accelerates precipitation of intermetallic compounds, and the upper limit of the content of Mo is set to 1.5% from the viewpoint of suppressing the precipitation during hot rolling.

Cu is an element that additionally enhances corrosion resistance of the stainless steel with respect to acids, and Cu also has an action of improving toughness. Therefore, Cu is recommended to be contained at a content of 0.3% or more. In the case where the content of Cu exceeds 2.0%, the content of Cu exceeds the solid solubility during hot rolling such that εCu precipitates and embrittlement occurs. Therefore, the upper limit of the content of Cu is set to 2.0%. In the case where Cu is contained, the content of Cu is preferably in a range of 0.3% to 1.5%.

Similarly to Mo, W is an element that additionally improves corrosion resistance of the stainless steel. For the purpose of enhancing the corrosion resistance, the upper limit of the content of W is set to 1.0%. The content of W is preferably in a range of 0.05% to 0.5%.

Co is an effective element for enhancing toughness and corrosion resistance of the steel, and Co is selectively added. The content of Co is preferably in a range of 0.03% or more. In the case where the content of Co exceeds 2.0%, a cost-effective effect is not exhibited because Co is an expensive element. Therefore, the upper limit of the content of Co is specified to 2.0%. In the case where Co is added, the content of Co is preferably in a range of 0.03% to 1.0%.

In order to improve hot workability, one or more selected from B, Ca, Mg and REM may be selectively contained as necessary.

All of B, Ca, Mg and REM are elements that improve hot workability of the steel, and one or more thereof may be contained for the purpose of improving the hot workability. In the case where excessive amounts of B, Ca, Mg and REM are contained, the hot workability and toughness degrade. Therefore, the upper limits of the contents of B, Ca, Mg and REM are specified as follows.

The upper limit of the content of B and the upper limit of the content of Ca are set to 0.0050%. The upper limit of the content of Mg is set to 0.0030%. The upper limit of the content of REM is set to 0.10%. The preferable contents are B: 0.0005% to 0.0030%, Ca: 0.0005% to 0.0030%, Mg: 0.0001% to 0.0015% and REM: 0.005% to 0.05%, respectively. Here, REM refers to rare earth metals, and REM is one or more selected from Sc, Y, La, Ce, Pr, Nd, Pm, Sm Eu, Gd, Tb, Dy, Ho, Er, Tm, Yb and Lu. The content of REM is the sum of the contents of the above-described elements.

(Method for Producing the Clad Steel Plate)

The method for producing the clad steel plate includes: a step of joining a steel plate of a base metal and a steel plate of a cladding material by hot rolling; and a step of subsequently cooling the plates. The steel plate of the cladding material has the chemical composition of the duplex stainless steel of the cladding material described in the first and second embodiments of the clad steel plate.

At first, joining surfaces of the base metal and the cladding material having predetermined thicknesses are cleaned and laminated. Then, four circumferences of the joining surfaces are joined by welding; and thereby, a slab (billet) is assembled which consists of the base metal and the cladding material. Meanwhile, in order to increase a joining strength, vacuum degassing, insertion of an insert material between the joining surfaces and the like are appropriately carried out. The slab is subjected to normal hot rolling; and thereby, the entire surface of the joining surfaces of the base metal and the cladding material are joined. As a result, a clad steel plate is produced.

An input side temperature TF of a final finishing rolling pass of the hot rolling dominates the strength of the base metal, and a higher strength is obtained as TF decreases. In addition, in the case where TF is excessively decreased, a precipitation amount of chromium nitrides in the cladding material during the hot rolling increases, and corrosion resistance is impaired.

In the experiment of the inventors, in the case where TF was lower than the chromium nitride precipitation temperature by more than 100° C., corrosion resistance degraded beyond an acceptable value. Therefore, the lower limit of TF is specified to {(chromium nitride precipitation temperature)−100}(° C.).

That is, in the case where the cladding material does not contain V, Nb and Ti which are selective elements, the input side temperature TF of the final finishing rolling pass of the hot rolling is adjusted so as to fulfill the following formula (5). In the case where the cladding material contains the above-described selective components, the input side temperature TF of the final finishing rolling pass of the hot rolling is adjusted so as to fulfill the following formula (6)).

$$TF \geq TN - 100 \tag{5}$$

$$TF \geq TN2 - 100 \tag{6}$$

In addition, the upper limit of TF is not particularly specified. However, in order to obtain toughness of the base metal, it is necessary to set the upper limit of TF to approximately 960° C. The upper limit temperature of TF depends on the composition of the base metal to some extent.

During the cooling in the temperature range from TF to 600° C., precipitation of chromium nitrides proceeds. In order to suppress the precipitation, it is necessary to rapidly cool the steel material. A precipitation rate of the chromium nitrides increases as the chromium nitride precipitation temperature of the steel increases. In the embodiment in which the chromium nitride precipitation temperature is limited to be in a range of 970° C. or lower, in the case where a cooling time from TF to 600° C. exceeds 5 minutes, a precipitation amount of the chromium nitrides increases, and corrosion resistance is impaired. Therefore, the cooling time from TF to 600° C. is specified to be in a range of 5 minutes or less.

In the method for producing the clad steel plate according to the embodiment, a preferable aspect of accelerated cooling after the end of the hot rolling will be described below.

The accelerated cooling after the end of the hot rolling is carried out in order to suppress precipitation of chromium nitrides in the cladding material after the end of the rolling. The precipitation in the duplex stainless steel material after the hot rolling proceeds in a supercooled state, and a precipitation rate exhibits the maximum value in a temperature range of 600° C. to 800° C. The maximum value increases with a degree of supercooling from the chromium nitride precipitation temperature. Therefore, it is desirable to cool the cladding material immediately after finishing rolling. In addition, in the case where a plate thickness exceeds 20 mm, it is preferable to conduct accelerated cooling. Based on the experimental results by the inventors, it is preferable that an accelerated cooling initiation temperature TC is set to be in a range of {(chromium nitride precipitation temperature)–250}(° C.) or higher.

That is, in the case where the cladding material does not contain V, Nb and Ti which are selective components, the accelerated cooling is initiated from the accelerated cooling initiation temperature TC that fulfills the following formula (7). In the case where the cladding material contains the above-described selective components, the accelerated cooling is initiated from the accelerated cooling initiation temperature TC that fulfills the following formula (8).

$$TC \geq TN-250 \text{ (here, } TF \geq TC\text{)} \quad (7)$$

$$TC \geq TN2-250 \text{ (here, } TF \geq TC\text{)} \quad (8)$$

Meanwhile, TC is preferably set to be in a range of {(chromium nitride precipitation temperature)–150}(° C.) to the chromium nitride precipitation temperature. In addition, the accelerated cooling also has an action of increasing the strength of the base metal at the same time.

In addition, it is reasonable to use water or a gas-water mixture (a mixture of gas and water) as a medium for the accelerated cooling from the viewpoint of facility costs.

EXAMPLES

Hereinafter, examples will be described.

Example 1

Tables 1 and 2 (subsequent to Table 1) show chemical compositions of test steels.

Meanwhile, in the chemical compositions shown in Tables 1 and 2, the remainder consists of iron and inevitable impurities. REM refers to lanthanoid-based rare earth elements, and the content of REM represents the sum of the above elements. In addition, O is an inevitable impurity.

Chromium nitride precipitation temperatures TN and TN2 in the tables were obtained by the following procedure.

(1) A 10 mm-thick test steel is subjected to a solution heat treatment under the conditions described below.

(2) Soaking is carried out at an arbitrary temperature of 800° C. to 1000° C. for 20 minutes, and then water cooling is carried out after a time of 5 seconds or less is passed.

(3) A surface layer of the cooled test steel is wet-polished using a #500 Emery paper.

(4) 3 g of a specimen is sampled, and the specimen is electrolyzed (at a constant voltage of 100 mV) in a non-aqueous solution (3% maleic acid+1% tetramethylammonium chloride+the remainder being methanol); and thereby, a matrix is dissolved.

(5) A residue (=precipitate) is filtered using a filter having a hole diameter of 0.2 μm, and the precipitate is extracted.

(6) A chemical composition of the residue is analyzed, and a content of chromium is obtained. The content of chromium in the residue is used as an index of a precipitation amount of chromium nitrides.

(7) Specimens are manufactured at a variety of temperatures of the soaking in the above (2), and contents of chromium in electrolyzed residues are measured. Among the soaking temperatures at which the content of chromium in the residue becomes in a range of 0.01% or less, the lowest temperature is used as TN. In addition, in the case where any one or more of V, Ti and Nb are contained, the lowest temperature is used as TN2 among the soaking temperatures at which the content of chromium becomes in a range of 0.03% or less.

A billet having a thickness of 140 mm was used as a material for hot rolling.

The hot rolling was carried out by the following procedure. The billet was heated to a predetermined temperature of 1150° C. to 1250° C., and then the billet was repeatedly rolled using a 2Hi rolling mill in a laboratory. Final finishing rolling was conducted at a temperature of 780° C. to 1080° C., and the billet was rolled so that a final plate thickness became in a range of 6 mm to 35 mm.

This hot rolled steel material was cut into halves, and one steel material was subjected to a solution heat treatment. The solution heat treatment was carried out by the following procedure. At first, the steel material was inserted into a heat treatment furnace in which the temperature was set to 1000° C., and the steel material was heated for 5 minutes (soaking time) in the heat treatment furnace. Next, the steel material was picked out (extracted), and then water-cooling was conducted until a temperature became the room temperature.

A tensile test of the hot rolled steel material was carried out by the following procedure. For a material having a plate thickness of 6 mm, a sheet-like test specimen having an ASTM13B shape was sampled at right angle to the rolling direction. For a material having a plate thickness of 10 mm, a round bar tensile test specimen having a diameter of 8 mm at a parallel portion was sampled at right angle to the rolling direction. For a material having a plate thickness of 20 mm, 30 mm or 35 mm, a round bar tensile test specimen having a diameter of 10 mm was sampled at right angle to the rolling direction. Meanwhile, for a material having a plate thickness of 30 mm or 35 mm, a test specimen was sampled from a portion at a quarter (¼ portion) of the plate thickness. Yield strength differences before and after the solution heat treatment were shown in Tables 3 and 4.

A pitting potential of the hot rolled steel material was measured by the following procedure. For a steel material before the solution heat treatment and a steel material after the solution heat treatment, a potential (VC' 100) at which a current density corresponded to 100 μA/cm² was measured for 4 samples by the method specified in JIS G0577 with regard to a surface 1 mm below a surface (surface layer) of the steel material, and an average value was obtained. Differences between the average value of the potential (VC' 100) of the steel material before the solution heat treatment and the average value of the potential (VC' 100) of the steel material after the solution heat treatment were shown in Tables 3 and 4.

An impact toughness of the hot rolled steel material was measured by the following procedure. Three JIS No. 4

Charpy test specimens in which a mechanically worked 2 mm-deep V-notch was formed in the rolling direction were sampled. Meanwhile, the test specimens were sampled so that a fracture surface propagated in parallel with the rolling direction.

For a steel material having a plate thickness of 6 mm, ½-sized Charpy test specimens were used for evaluation. For a steel material having a plate thickness of 10 mm, ¾-sized Charpy test specimens were used for evaluation. For a steel material having a plate thickness of 20 mm, full-sized Charpy test specimens sampled from a center portion of the plate thickness were used for evaluation. For a steel material having a plate thickness of 30 mm or 35 mm, full-sized Charpy test specimens sampled from a portion at a quarter (¼ portion) of the plate thickness were used for evaluation.

The test temperature was set to −20° C., and the three Charpy test specimens were subjected to an impact test using a testing machine with a specification of the maximum energy of 500 J. Tables 3 and 4 show results of average values (J/cm²) of impact values of the three test specimens.

The steels shown in Tables 1 and 2 were subjected to finishing rolling so as to obtain a plate thickness of 10 mm under conditions where TF (hot rolling final finishing temperature) was 930° C., and then air cooling was conducted; and thereby, hot rolled steel materials were produced. The characteristics of the hot rolled steel materials obtained in the above-described manner are shown in the examples of Table 3. Meanwhile, in the column of "composition" in Table 3, the sign α indicates a steel material in which contents of all the elements fulfilled the ranges defined in the embodiment. The sign β indicates a steel material in which a content of any of the elements failed to fulfill the range defined in the embodiment.

The details of production conditions and measurement conditions of the examples in Table 3 will be described below.

The plate thickness: 10 mm, the rolling finishing temperature TF: 930° C., the method for cooling after hot rolling: air cooling Conditions of the solution heat treatment: the specimen was heated (soaked) at 1000° C. for 5 minutes, and then water cooling was conducted.

A yield strength difference: a round bar tensile test specimen having a diameter of 8 mm at a parallel portion was sampled at right angle to the rolling direction. A difference between a 0.2% proof stress of a steel material that was not subjected to the solution heat treatment and a 0.2% proof stress of a steel material that was subjected to the solution heat treatment was obtained.

A pitting potential difference: in a NaCl aqueous solution having a concentration of 1 kM/m³ (an aqueous solution containing approximately 59 g of NaCl per one liter), a potential (VC' 100) was measured for 4 samples at which a current density corresponded to 100 μA/cm² at 30° C., and an average value was obtained. A difference between the average value of the potential of the steel material before the solution heat treatment and the average value of the potential of the steel material after the solution heat treatment was obtained.

An impact property: ¾-sized Charpy test specimens were manufactured, and a mechanically worked 2 mm-deep V-notch was formed in the rolling direction. Next, impact values were measured at −20° C. for three Charpy test specimens, and an average value was obtained.

In the examples of Table 3, with regard to the steel materials having chromium nitride precipitation temperatures of 960° C. or lower, a difference in strength between the steel material in a state in which the solution heat treatment was not carried out and the steel material that had been subjected to the solution heat treatment was in a range of 50 MPa or more, and an amount of decrease in the pitting potential was in a range of 0.05 V or less. In addition, the impact value at −20° C. was in a range of 50 J/cm² or more. As such, it is clear that the first and second embodiments of the alloying element-saving hot rolled duplex stainless steel materials are excellent in terms of strength, corrosion resistance and impact property.

Using some of the steels shown in Tables 1 and 2, hot rolled steel materials having plate thicknesses of 6 mm to 35 mm were produced under a variety of hot rolling conditions. The evaluation results of the strengths, the corrosion resistances and the impact properties of the obtained hot rolled steel materials are shown in the examples of Table 4. Meanwhile, in Table 4, TC represents the initiation temperature of the accelerated cooling.

In Invention Examples, the difference in strength between the steel material and the material that had been subjected to the solution heat treatment was in a range of 50 MPa or more, and an amount of decrease in the pitting potential was in a range of 0.05 V or less. In addition, the impact value at −20° C. was in a range of 50 J/cm² or more. As such, it is clear that the hot rolled steel materials of Invention Examples manufactured under the conditions disclosed in the embodiment are excellent in terms of strength, corrosion resistance and impact property.

Meanwhile, in Comparative Example No. 1-42, TF was the extremely high temperature exceeding the solution heat treatment temperature. Therefore, the strength was low and failed to reach the target strength.

As is evident from the above-described examples, according to the embodiments, it became clear that a high-strength hot rolled duplex stainless steel material that is not subjected to a solution heat treatment can be obtained.

TABLE 1

| No. | | C | Si | Mn | P | S | Ni | Cr | N | Al | O |
|---|---|---|---|---|---|---|---|---|---|---|---|
| 1-A | Invention | 0.018 | 0.35 | 0.98 | 0.024 | 0.0011 | 2.65 | 20.9 | 0.180 | 0.015 | 0.004 |
| 1-B | example | 0.020 | 0.34 | 3.01 | 0.024 | 0.0008 | 2.70 | 20.9 | 0.182 | 0.014 | 0.004 |
| 1-C | | 0.019 | 0.35 | 4.99 | 0.024 | 0.0009 | 2.70 | 20.9 | 0.178 | 0.015 | 0.004 |
| 1-D | | 0.019 | 0.34 | 2.98 | 0.023 | 0.0007 | 2.53 | 20.8 | 0.178 | 0.013 | 0.004 |
| 1-E | | 0.018 | 0.36 | 3.53 | 0.023 | 0.0014 | 2.04 | 20.9 | 0.168 | 0.023 | 0.003 |
| 1-F | | 0.012 | 0.45 | 1.68 | 0.024 | 0.0007 | 4.02 | 23.4 | 0.142 | 0.015 | 0.004 |
| 1-G | | 0.015 | 0.42 | 1.65 | 0.023 | 0.0006 | 3.67 | 22.9 | 0.153 | 0.018 | 0.004 |
| 1-H | | 0.021 | 0.35 | 2.56 | 0.021 | 0.0006 | 2.36 | 19.6 | 0.154 | 0.017 | 0.004 |
| 1-I | | 0.022 | 0.39 | 3.12 | 0.022 | 0.0005 | 2.02 | 21.1 | 0.178 | 0.011 | 0.004 |
| 1-J | | 0.024 | 0.59 | 4.95 | 0.035 | 0.0006 | 1.62 | 20.9 | 0.211 | 0.018 | 0.003 |
| 1-K | | 0.018 | 0.33 | 1.52 | 0.024 | 0.0008 | 3.95 | 23.1 | 0.138 | 0.014 | 0.003 |
| 1-L | | 0.023 | 0.45 | 3.01 | 0.024 | 0.0006 | 1.98 | 20.7 | 0.166 | 0.021 | 0.002 |

TABLE 1-continued

| No. | | C | Si | Mn | P | S | Ni | Cr | N | Al | O |
|---|---|---|---|---|---|---|---|---|---|---|---|
| 1-M | | 0.006 | 0.21 | 0.65 | 0.025 | 0.0005 | 4.85 | 23.2 | 0.095 | 0.026 | 0.002 |
| 1-N | | 0.025 | 0.72 | 5.03 | 0.025 | 0.0005 | 0.85 | 20.6 | 0.206 | 0.013 | 0.004 |
| 1-O | | 0.019 | 0.42 | 2.87 | 0.025 | 0.0007 | 2.50 | 21.4 | 0.175 | 0.022 | 0.003 |
| 1-P | | 0.026 | 0.36 | 3.45 | 0.026 | 0.0006 | 4.45 | 24.8 | 0.265 | 0.016 | 0.004 |
| 1-Q | Comparative | 0.020 | 0.35 | <u>0.10</u> | 0.024 | 0.0012 | 2.01 | 20.9 | 0.179 | 0.013 | 0.004 |
| 1-R | example | 0.019 | 0.36 | <u>7.98</u> | 0.024 | 0.0015 | 2.00 | 20.9 | 0.180 | 0.015 | 0.004 |
| 1-S | | 0.020 | 0.41 | 2.50 | 0.023 | 0.0008 | 1.56 | 21.8 | 0.220 | 0.021 | 0.003 |
| 1-T | | 0.020 | 0.42 | 1.05 | 0.021 | 0.0012 | 2.53 | 23.1 | 0.215 | 0.016 | 0.012 |
| 1-U | | <u>0.049</u> | 0.35 | 3.00 | 0.025 | 0.0006 | 2.00 | 20.9 | 0.180 | 0.014 | 0.003 |
| 1-V | | 0.022 | <u>1.23</u> | 6.23 | 0.024 | 0.0006 | 1.02 | <u>17.8</u> | 0.150 | 0.023 | 0.004 |
| 1-W | | 0.015 | 0.65 | 1.50 | 0.025 | 0.0006 | 4.20 | <u>25.9</u> | 0.270 | 0.014 | 0.003 |
| 1-X | | 0.015 | 0.65 | 1.50 | 0.025 | 0.0006 | 3.50 | 24.5 | <u>0.320</u> | 0.014 | 0.003 |
| 1-Y | | 0.022 | 0.42 | 3.52 | 0.023 | 0.0007 | 1.75 | 21.3 | 0.175 | 0.015 | 0.003 |

TABLE 2

| No. | | V | Nb | Ti | Mo | Cu | W | Co | B | Ca | Mg | REM | TN (° C.) | TN2 (° C.) |
|---|---|---|---|---|---|---|---|---|---|---|---|---|---|---|
| 1-A | Invention | | | | | | | | | | | | 960 | |
| 1-B | example | 0.11 | | | | | | | | | | | | 930 |
| 1-C | | | 0.045 | | | | | | | | | | | 900 |
| 1-D | | | | 0.006 | | | | | | | | | | 910 |
| 1-E | | | | | | 1.02 | 0.35 | | | | | | 900 | |
| 1-F | | | | | | | | | 0.0022 | 0.0018 | | | 930 | |
| 1-G | | 0.12 | | 0.005 | | | | | 0.0025 | 0.0002 | | | | 940 |
| 1-H | | 0.12 | | | 0.32 | 0.35 | | 0.25 | 0.0023 | 0.0005 | | | | 920 |
| 1-I | | | | 0.011 | 0.33 | 0.98 | | | 0.0026 | 0.0023 | | | | 910 |
| 1-J | | 0.06 | 0.035 | | 0.31 | | | | | | | 0.012 | | 950 |
| 1-K | | 0.12 | | 0.008 | 0.26 | 0.25 | | | | | | | | 890 |
| 1-L | | 0.24 | | | 0.30 | 0.92 | | 0.11 | 0.0023 | 0.0024 | | | | 910 |
| 1-M | | 0.12 | 0.018 | 0.012 | 0.23 | | | 0.08 | | | | | | 870 |
| 1-N | | | 0.035 | | 0.26 | 0.89 | | | | | | | | 940 |
| 1-O | | 0.07 | | 0.008 | 1.23 | 1.56 | | 0.36 | | | 0.0009 | 0.023 | | 930 |
| 1-P | | | | | 1.22 | 1.12 | 0.32 | | 0.0014 | 0.0016 | | | 950 | |
| 1-Q | Comparative | | | | 0.30 | 1.00 | | | | | | | <u>970</u> | |
| 1-R | example | | | | 0.31 | 1.01 | | | | | | | 880 | |
| 1-S | | | | | 0.26 | 0.23 | | | | | | | <u>970</u> | |
| 1-T | | | | | 0.23 | 0.26 | | | | | | | <u>970</u> | |
| 1-U | | | | | 0.30 | 1.00 | | | | | | | <u>970</u> | |
| 1-V | | | | | 0.30 | 1.32 | | | | | | | 890 | |
| 1-W | | | | | <u>1.85</u> | 0.26 | | | | | | | <u>980</u> | |
| 1-X | | | | | 0.89 | 0.26 | | | | | | | <u>990</u> | |
| 1-Y | | | | | 0.23 | <u>2.34</u> | | | | | | | 920 | |

TABLE 3

| No. | | Steel No. | Composition | TN (° C.) | TN2 (° C.) | Yield strength difference (MPa) | Pitting potential difference (V) | Impact property (J/cm²) |
|---|---|---|---|---|---|---|---|---|
| 1-1 | Invention | 1-A | α | 960 | | 200 | −0.05 | 55 |
| 1-2 | example | 1-B | α | | 930 | 180 | −0.03 | 105 |
| 1-3 | | 1-C | α | | 900 | 190 | −0.01 | 120 |
| 1-4 | | 1-D | α | | 910 | 190 | −0.03 | 110 |
| 1-5 | | 1-E | α | 900 | | 150 | −0.03 | 95 |
| 1-6 | | 1-F | α | 930 | | 180 | −0.03 | 90 |
| 1-7 | | 1-G | α | | 940 | 180 | −0.01 | 130 |
| 1-8 | | 1-H | α | | 920 | 170 | −0.02 | 95 |
| 1-9 | | 1-I | α | | 910 | 180 | −0.01 | 80 |
| 1-10 | | 1-J | α | | 950 | 220 | −0.03 | 55 |
| 1-11 | | 1-K | α | | 890 | 160 | −0.02 | 140 |
| 1-12 | | 1-L | α | | 910 | 170 | −0.02 | 115 |
| 1-13 | | 1-M | α | | 870 | 130 | −0.01 | 160 |
| 1-14 | | 1-N | α | | 940 | 190 | −0.03 | 60 |
| 1-15 | | 1-O | α | | 930 | 180 | −0.03 | 75 |
| 1-16 | | 1-P | α | 950 | | 230 | −0.04 | 60 |
| 1-17 | Comparative | 1-Q | β | 970 | | 190 | <u>−0.07</u> | <u>25</u> |
| 1-18 | example | 1-R | β | 880 | | 200 | −0.02 | <u>40</u> |
| 1-19 | | 1-S | α | 970 | | 220 | <u>−0.06</u> | <u>35</u> |
| 1-20 | | 1-T | α | 970 | | 210 | <u>−0.06</u> | <u>25</u> |
| 1-21 | | 1-U | β | 970 | | 200 | <u>−0.07</u> | <u>35</u> |
| 1-22 | | 1-V | β | 890 | | 180 | −0.01 | <u>40</u> |
| 1-23 | | 1-W | β | 980 | | 240 | <u>−0.12</u> | <u>35</u> |

TABLE 3-continued

| No. | Steel No. | Composition | TN (° C.) | TN2 (° C.) | Yield strength difference (MPa) | Pitting potential difference (V) | Impact property (J/cm²) |
|---|---|---|---|---|---|---|---|
| 1-24 | 1-X | β | 990 | | 270 | <u>−0.14</u> | <u>20</u> |
| 1-25 | 1-Y | β | 920 | | 250 | <u>−0.07</u> | <u>30</u> |

TABLE 4

| No. | | Steel No. | Plate thickness (mm) | TN (° C.) | TN2 (° C.) | TF (° C.) | TC (° C.) | Cooling time (sec) | Yield strength difference (MPa) | Pitting potential difference (V) | Impact property (J/cm²) |
|---|---|---|---|---|---|---|---|---|---|---|---|
| 1-26 | Invention | 1-A | 10 | 960 | | 930 | 790 | 110 | 200 | −0.03 | 60 |
| 1-27 | example | 1-A | 20 | 960 | | 950 | 850 | 150 | 120 | −0.02 | 70 |
| 1-28 | | 1-A | 30 | 960 | | 960 | 850 | 160 | 70 | −0.02 | 75 |
| 1-29 | | 1-B | 6 | | 930 | 920 | Air cooling | 100 | 210 | −0.01 | 125 |
| 1-30 | | 1-B | 10 | | 930 | 900 | Air cooling | 130 | 200 | −0.02 | 105 |
| 1-31 | | 1-B | 20 | | 930 | 910 | Air cooling | 280 | 100 | −0.02 | 120 |
| 1-32 | | 1-B | 30 | | 930 | 950 | 840 | 110 | 70 | −0.01 | 110 |
| 1-33 | | 1-C | 10 | | 900 | 880 | 770 | 120 | 220 | −0.02 | 100 |
| 1-34 | | 1-C | 20 | | 900 | 930 | 830 | 70 | 110 | −0.02 | 110 |
| 1-35 | | 1-C | 30 | | 900 | 960 | 830 | 130 | 70 | −0.01 | 120 |
| 1-36 | | 1-I | 10 | | 910 | 940 | Air cooling | 130 | 170 | −0.01 | 120 |
| 1-37 | | 1-I | 20 | | 910 | 950 | 820 | 80 | 110 | −0.02 | 110 |
| 1-38 | | 1-I | 30 | | 910 | 990 | 840 | 80 | 60 | −0.02 | 100 |
| 1-39 | Comparative | 1-B | 10 | | 930 | <u>810</u> | 740 | 60 | 270 | <u>−0.06</u> | <u>40</u> |
| 1-40 | example | 1-B | 35 | | 930 | 950 | Air cooling | <u>400</u> | 60 | <u>−0.09</u> | <u>40</u> |
| 1-41 | | 1-C | 10 | | 900 | <u>830</u> | Air cooling | 130 | 250 | <u>−0.06</u> | <u>45</u> |
| 1-42 | | 1-C | 30 | | 900 | <u>1020</u> | 940 | 60 | <u>30</u> | −0.02 | 150 |
| 1-43 | | 1-I | 10 | | 910 | <u>780</u> | Air cooling | 100 | 300 | <u>−0.06</u> | <u>30</u> |
| 1-44 | | 1-I | 30 | | 910 | <u>820</u> | 660 | <u>450</u> | 140 | <u>−0.11</u> | <u>40</u> |
| 1-45 | | 1-J | 30 | | 950 | <u>1080</u> | 1010 | 60 | 20 | <u>−0.07</u> | 80 |

Example 2

Tables 5 and 6 (subsequent to Table 5) show the chemical compositions of cladding materials.

Meanwhile, in the chemical compositions shown in Tables 5 and 6, the remainder consists of iron and inevitable impurities. REM refers to lanthanoid-based rare earth elements, and the content of REM represents the sum of the above elements. In addition, O is an inevitable impurity.

Chromium nitride precipitation temperatures TN and TN2 in the tables were obtained by the following procedure.

(1) A 10 mm-thick test steel is subjected to a solution heat treatment under the conditions described below.

(2) Soaking is carried out at an arbitrary temperature of 800° C. to 1000° C. for 20 minutes, and then water cooling is carried out after a time of 5 seconds or less is passed.

(3) A surface layer of the cooled test steel is wet-polished using a #500 Emery paper.

(4) 3 g of a specimen is sampled, and the specimen is electrolyzed (at a constant voltage of 100 mV) in a non-aqueous solution (3% maleic acid+1% tetramethylammonium chloride+the remainder being methanol); and thereby, a matrix is dissolved.

(5) A residue (=precipitate) is filtered using a filter having a hole diameter of 0.2 μm, and the precipitate is extracted.

(6) A chemical composition of the residue is analyzed, and a content of chromium is obtained. The content of chromium in the residue is used as an index of a precipitation amount of chromium nitrides.

(7) Specimens are manufactured at a variety of temperatures of the soaking in the above (2), and contents of chromium in electrolyzed residues are measured. Among the soaking temperatures at which the content of chromium in the residue becomes in a range of 0.01% or less, the lowest temperature is used as TN. In addition, in the case where any one or more of V, Ti and Nb are contained, the lowest temperature is used as TN2 among the soaking temperatures at which the content of chromium becomes in a range of 0.03% or less.

A clad steel plate was manufactured by the following method. Duplex stainless steels having the chemical compositions shown in Tables 5 and 6 were used as cladding materials. A SS400 steel having a composition containing C: 0.16%, Si: 0.21%, Mn: 0.63%, P: 0.018%, S: 0.006%, Ni: 0.01%, Cr: 0.04% and Cu: 0.02% with a remainder being Fe and inevitable impurities and a predetermined thickness was used as a base metal. Joining surfaces (main surfaces) of the base metal and the cladding material were laminated, and four circumferences of the joining surfaces were joined by welding; and thereby, a slab (billet) having a thickness of 130 mm was assembled. This slab was used as a material for hot rolling.

The hot rolling was carried out by the following method. The slab was heated to a predetermined temperature of 1150° C. to 1220° C. with the cladding material-side surface downward. Next, hot rolling was carried out using a 2Hi rolling mill in a laboratory; and thereby, a clad steel plate was manufactured. In the hot rolling, the slab was repeatedly rolled 10 times to 15 times, and the slab was subjected to finishing rolling at a temperature of 760° C. to 1000° C. so that the final plate thickness became in a range of 10 mm to 35 mm. Then, the steel plate was transported to a cooling bed, and the steel plate was cooled in the air or cooled using water. A rolled clad steel plate in which a thickness of the cladding material was 3 mm was obtained in the above-described manner. Next, some portions of this steel plate were subjected to a solution heat treatment at 1000° C.; and thereby, a specimen for pitting potential measurement was manufactured.

A pitting potential of the cladding material was measured by the following procedure. For a steel material (cladding material) before the solution heat treatment and a steel material (cladding material) after the solution heat treatment, a potential (VC' 100) at which a current density corresponded to 100 μA/cm² was measured for 4 samples by the method specified in JIS G0577 with regard to a surface 1 mm below a surface (surface layer) of the steel material, and an average value was obtained. Differences between the average value of the potential (VC' 100) of the cladding material before the solution heat treatment and the average value of the potential (VC' 100) of the cladding material after the solution heat treatment were shown in Tables 7 and 8.

A tensile test of the clad steel plate was carried out by the following procedure. A No. 1A test specimen of JIS Z2201 (tensile test specimen) was sampled at right angle to the rolling direction. This tensile test specimen was a test specimen worked into a sheet-like shape without grinding the main surface of the clad steel plate. A tensile strength was measured according to JIS Z2241. Three test specimens were subjected to the tensile test at the room temperature. Tables 7 and 8 show results of average values (MPa) of the tensile strengths of the three test specimens.

An impact toughness of the clad steel plate was measured by the following procedure. A JIS No. 4 Charpy test specimen in which a mechanically worked 2 mm-deep V-notch was formed in the rolling direction was sampled from the base metal. Meanwhile, the test specimen was sampled so that a fracture surface propagated in parallel with the rolling direction.

For a material (clad steel plate) having a plate thickness of 10 mm, a sub-sized impact test specimen having a width of 5 mm at a parallel portion was sampled from the base metal. For a material (clad steel plate) having a plate thickness of 15 mm, a full-sized impact test specimen having a width of 10 mm was sampled from the base metal. For a material (clad steel plate) having a plate thickness of 25 mm, a full-sized impact test specimen having a width of 10 mm was sampled from the center of the plate thickness of the base metal. For a material (clad steel plate) having a plate thickness of 35 mm, a full-sized impact test specimen having a width of 10 mm was sampled from a portion at a quarter (¼ portion) of the plate thickness of the base metal.

Three Charpy test specimens were subjected to an impact test according to the method of JIS G2242. The test temperature was set to −20° C., and the three Charpy test specimens were subjected to the impact test using a testing machine with a specification of the maximum energy of 500 J. Tables 7 and 8 show results of average values (J/cm²) of impact values of the three test specimens.

The steels shown in Tables 5 and 6 were used as the cladding material, steels were subjected to finishing rolling so as to obtain a plate thickness of 10 mm under conditions where TF (hot rolling final finishing temperature) was set to 900° C., and then air cooling was conducted; and thereby, clad steel plates were produced. The characteristics of the clad steel plates obtained in the above-described manner are shown in the examples of Table 7. Meanwhile, in the column of "composition" in Table 7, the sign α indicates a steel material in which contents of all the elements fulfilled the ranges defined in the embodiment. The sign β indicates a steel material in which a content of any of the elements failed to fulfill the range defined in the embodiment.

The details of production conditions and measurement conditions of the examples in Table 7 and the evaluation results of the tensile strength and the impact properties will be described below.

The plate thickness: 10 mm, the rolling finishing temperature TF: 930° C., the method for cooling after hot rolling: air cooling Condition of solution heat treatment: the specimen was heated (soaked) at 1000° C. for 5 minutes, and then water cooling was conducted.

A pitting potential difference: in a NaCl aqueous solution having a concentration of 1 kM/m³ (an aqueous solution containing approximately 59 g of NaCl per one liter), a potential (VC' 100) at which a current density corresponded to 100 μA/cm² at 30° C. was measured for 4 samples, and an average value was obtained. A difference between the average value of the potential of the cladding material before the solution heat treatment and the average value of the potential of the cladding material after the solution heat treatment was obtained.

A tensile strength of the base metal: a sheet-like tensile test specimen having a thickness of 6 mm was sampled at right angle to the rolling direction. Then, the tensile strengths of three test specimens were measured at the room temperature according to JIS Z2241, and an average value was obtained. As a result, the tensile strengths were in a range of 470 MPa to 490 MPa in all of the examples.

An impact property of the base metal: a ½-sized Charpy test specimens were manufactured, and a mechanically worked 2 mm-deep V-notch was formed in the rolling direction. Next, the impact values were measured at −20° C. for three Charpy test specimens, and an average value was obtained. As a result, the impact properties were in a range of 40 J/cm² to 60 J/cm² in all of the examples.

In the examples of Table 7, with regard to the clad steel plates which included steel materials having chromium nitride precipitation temperatures of 970° C. or lower, an amount of decrease in the pitting potential was in a range of less than 0.10 V in a state in which the solution heat treatment was not carried out. In addition, the tensile strengths of all the base metals were in a range of 470 MPa to 490 MPa, and the impact value at −20° C. was in a range of 40 J/cm² to 60 J/cm². As such, it is clear that the first and second embodiments of the clad steel plates are excellent in terms of the corrosion resistance of the cladding material and the strength and the impact property of the base metal.

Using some of the cladding materials shown in Tables 5 and 6, clad steel plates having plate thicknesses of 10 mm to 35 mm were produced under a variety of hot rolling conditions. The evaluation results of the corrosion resistance, the strengths and the impact properties of the obtained clad steel plates are shown in the examples of Table 8. Meanwhile, in Table 8, TC represents the initiation temperature of the accelerated cooling.

In Invention Examples, a difference in the pitting potential between the cladding material of a clad steel plate and the material that had been subjected to the solution heat treatment was in a range of less than 0.10 V. In addition, the tensile strengths of the base metals were in a range of 400 MPa or more, and the impact values at −20° C. were in a range of 40 J/cm² or more. As such, it is clear that the clad steel plates of Invention Examples manufactured under the conditions disclosed in the embodiment are excellent in terms of corrosion resistance, strength and impact property.

Meanwhile, in Comparative Example No. 2-42, TF was the extremely high temperature of 1000° C. Therefore, the impact value of the base metal was low and failed to obtain the target impact property.

As is evident from the above examples, according to the embodiment, it became clear that a cheap clad steel plate which includes an alloying element-saving duplex stainless steel as a cladding material and is not subjected to a solution heat treatment can be obtained.

TABLE 5

| No. | | C | Si | Mn | P | S | Ni | Cr | N | Al | O |
|---|---|---|---|---|---|---|---|---|---|---|---|
| 2-A | Invention | 0.018 | 0.35 | 0.98 | 0.024 | 0.0011 | 2.65 | 20.9 | 0.180 | 0.015 | 0.004 |
| 2-B | example | 0.020 | 0.34 | 3.01 | 0.024 | 0.0008 | 2.70 | 20.9 | 0.182 | 0.014 | 0.004 |
| 2-C | | 0.019 | 0.35 | 4.99 | 0.024 | 0.0009 | 2.70 | 20.9 | 0.178 | 0.015 | 0.004 |
| 2-D | | 0.019 | 0.34 | 2.98 | 0.023 | 0.0007 | 2.53 | 20.8 | 0.178 | 0.013 | 0.004 |
| 2-E | | 0.018 | 0.36 | 3.53 | 0.023 | 0.0014 | 2.04 | 20.9 | 0.168 | 0.023 | 0.003 |
| 2-F | | 0.012 | 0.45 | 1.68 | 0.024 | 0.0007 | 4.02 | 23.4 | 0.142 | 0.015 | 0.004 |
| 2-G | | 0.015 | 0.42 | 1.65 | 0.023 | 0.0006 | 3.67 | 22.9 | 0.153 | 0.018 | 0.004 |
| 2-H | | 0.021 | 0.35 | 2.56 | 0.021 | 0.0006 | 2.36 | 19.6 | 0.154 | 0.017 | 0.004 |
| 2-I | | 0.022 | 0.39 | 3.12 | 0.022 | 0.0005 | 2.02 | 21.1 | 0.178 | 0.011 | 0.004 |
| 2-J | | 0.024 | 0.59 | 4.95 | 0.035 | 0.0006 | 1.62 | 20.9 | 0.211 | 0.018 | 0.003 |
| 2-K | | 0.018 | 0.33 | 1.52 | 0.024 | 0.0008 | 3.95 | 23.1 | 0.138 | 0.014 | 0.004 |
| 2-L | | 0.023 | 0.45 | 3.01 | 0.024 | 0.0006 | 1.98 | 20.7 | 0.166 | 0.021 | 0.002 |
| 2-M | | 0.006 | 0.21 | 0.65 | 0.025 | 0.0005 | 4.85 | 23.2 | 0.095 | 0.026 | 0.002 |
| 2-N | | 0.025 | 0.72 | 5.03 | 0.025 | 0.0005 | 0.85 | 20.6 | 0.206 | 0.013 | 0.004 |
| 2-O | | 0.019 | 0.42 | 2.87 | 0.025 | 0.0007 | 2.50 | 21.4 | 0.175 | 0.022 | 0.003 |
| 2-P | | 0.026 | 0.36 | 3.45 | 0.026 | 0.0006 | 4.45 | 24.8 | 0.265 | 0.016 | 0.004 |
| 2-Q | | 0.020 | 0.41 | 2.50 | 0.023 | 0.0008 | 1.56 | 21.8 | 0.220 | 0.021 | 0.003 |
| 2-R | Comparative | 0.021 | 0.39 | <u>0.12</u> | 0.024 | 0.0008 | 1.65 | 21.1 | 0.195 | 0.015 | 0.005 |
| 2-S | example | 0.018 | 0.52 | 2.45 | 0.025 | 0.0009 | 1.58 | 21.8 | 0.235 | 0.013 | 0.003 |
| 2-T | | 0.013 | 0.45 | 1.12 | 0.023 | 0.0012 | 2.45 | 23.1 | 0.245 | 0.001 | 0.012 |
| 2-U | | <u>0.036</u> | 0.38 | 3.02 | 0.024 | 0.0007 | 1.95 | 20.9 | 0.215 | 0.013 | 0.003 |
| 2-V | | 0.024 | <u>1.42</u> | 1.25 | 0.024 | 0.0005 | 0.52 | <u>17.8</u> | 0.185 | 0.023 | 0.004 |
| 2-W | | 0.015 | 0.65 | 1.50 | 0.025 | 0.0006 | 4.20 | <u>25.9</u> | 0.270 | 0.014 | 0.003 |
| 2-X | | 0.015 | 0.65 | 1.50 | 0.025 | 0.0006 | 3.50 | 24.5 | <u>0.320</u> | 0.014 | 0.003 |
| 2-Y | | 0.021 | 0.41 | 3.38 | 0.022 | 0.0007 | 1.65 | 21.5 | 0.175 | 0.013 | 0.003 |

TABLE 6

| No. | | V | Nb | Ti | Mo | Cu | W | Co | B | Ca | Mg | REM | TN (° C.) | TN2 (° C.) |
|---|---|---|---|---|---|---|---|---|---|---|---|---|---|---|
| 2-A | Invention | | | | | | | | | | | | 960 | |
| 2-B | example | 0.11 | | | | | | | | | | | | 930 |
| 2-C | | | 0.045 | | | | | | | | | | | 900 |
| 2-D | | | | 0.006 | | | | | | | | | | 910 |
| 2-E | | | | | | 1.02 | 0.35 | | | | | | 900 | |
| 2-F | | | | | | | | | 0.0022 | 0.0018 | | | | 930 |
| 2-G | | 0.12 | | 0.005 | | | | | 0.0025 | | 0.0002 | | | 940 |
| 2-H | | 0.12 | | | 0.32 | 0.35 | | 0.25 | 0.0023 | 0.0005 | | | | 920 |
| 2-I | | | | 0.011 | 0.33 | 0.98 | | | 0.0026 | 0.0023 | | | | 910 |
| 2-J | | 0.06 | 0.035 | | 0.31 | | | | | | | 0.012 | | 950 |
| 2-K | | 0.12 | | 0.008 | 0.26 | 0.25 | | | | | | | | 890 |
| 2-L | | 0.24 | | | 0.30 | 0.92 | | 0.11 | 0.0023 | 0.0024 | | | | 910 |
| 2-M | | 0.12 | 0.018 | 0.012 | 0.23 | | | 0.08 | | | | | | 870 |
| 2-N | | | 0.035 | | 0.26 | 0.89 | | | | | | | | 940 |
| 2-O | | 0.07 | | 0.008 | 1.23 | 1.56 | | 0.36 | | 0.0009 | 0.023 | | | 930 |
| 2-P | | | | | 1.22 | 1.12 | 0.32 | | 0.0014 | 0.0016 | | | 950 | |
| 2-Q | | | | | 0.26 | 0.23 | | | | | | | 970 | |
| 2-R | Comparative | | | | 0.31 | 1.02 | | | | | | | <u>990</u> | |
| 2-S | example | | | | 0.29 | 0.08 | | | | | | | <u>980</u> | |
| 2-T | | | | | 0.35 | 0.24 | | | | | | | <u>990</u> | |
| 2-U | | | | | 0.28 | 1.00 | | | | | | | <u>980</u> | |
| 2-V | | | | | 0.30 | 1.03 | | | | | | | <u>980</u> | |
| 2-W | | | | | <u>1.85</u> | 0.26 | | | | | | | <u>980</u> | |
| 2-X | | | | | 0.89 | 0.26 | | | | | | | <u>990</u> | |
| 2-Y | | | | | 0.12 | <u>2.46</u> | | | | | | | 950 | |

TABLE 7

| No. | | Steel No. | Composition | TN (° C.) | TN2 (° C.) | Pitting potential difference (V) |
|---|---|---|---|---|---|---|
| 2-1 | Invention | 2-A | α | 960 | | −0.05 |
| 2-2 | example | 2-B | α | | 930 | −0.03 |
| 2-3 | | 2-C | α | | 900 | −0.01 |
| 2-4 | | 2-D | α | | 910 | −0.03 |
| 2-5 | | 2-E | α | 900 | | −0.03 |
| 2-6 | | 2-F | α | 930 | | −0.03 |
| 2-7 | | 2-G | α | | 940 | −0.01 |
| 2-8 | | 2-H | α | | 920 | −0.02 |
| 2-9 | | 2-I | α | | 910 | −0.01 |
| 2-10 | | 2-J | α | | 950 | −0.03 |
| 2-11 | | 2-K | α | | 890 | −0.02 |
| 2-12 | | 2-L | α | | 910 | −0.02 |
| 2-13 | | 2-M | α | | 870 | −0.01 |
| 2-14 | | 2-N | α | | 940 | −0.03 |
| 2-15 | | 2-O | α | | 930 | −0.03 |
| 2-16 | | 2-P | α | 950 | | −0.04 |
| 2-17 | | 2-Q | α | 970 | | −0.06 |
| 2-18 | Comparative | 2-R | β | 990 | | <u>−0.12</u> |
| 2-19 | example | 2-S | α | 980 | | <u>−0.11</u> |
| 2-20 | | 2-T | α | 990 | | <u>−0.12</u> |

TABLE 7-continued

| No. | Steel No. | Composition | TN (° C.) | TN2 (° C.) | Pitting potential difference (V) |
|---|---|---|---|---|---|
| 2-21 | 2-U | β | 980 | | -0.10 |
| 2-22 | 2-V | β | 980 | | -0.12 |
| 2-23 | 2-W | β | 980 | | -0.12 |
| 2-24 | 2-X | β | 990 | | -0.14 |
| 2-25 | 2-Y | β | 950 | | -0.12 |

TABLE 8

| No. | | Steel No. | Plate thickness (mm) | TN (° C.) | TN2 (° C.) | TF (° C.) | TC (° C.) | Cooling time (sec) | Pitting potential difference (V) | Tensile strength (MPa) | Impact property (J/cm²) |
|---|---|---|---|---|---|---|---|---|---|---|---|
| 2-26 | Invention | 2-A | 10 | 960 | | 930 | 790 | 110 | -0.03 | 540 | 40 |
| 2-27 | example | 2-A | 15 | 960 | | 950 | 850 | 150 | -0.02 | 540 | 40 |
| 2-28 | | 2-A | 25 | 960 | | 960 | 850 | 160 | -0.02 | 530 | 50 |
| 2-29 | | 2-B | 10 | | 930 | 920 | Air cooling | 100 | -0.01 | 480 | 50 |
| 2-30 | | 2-B | 10 | | 930 | 900 | Air cooling | 130 | -0.02 | 480 | 50 |
| 2-31 | | 2-B | 15 | | 930 | 910 | Air cooling | 280 | -0.02 | 480 | 50 |
| 2-32 | | 2-B | 25 | | 930 | 950 | 840 | 110 | -0.01 | 530 | 50 |
| 2-33 | | 2-C | 10 | | 900 | 880 | 770 | 120 | -0.02 | 550 | 60 |
| 2-34 | | 2-C | 15 | | 900 | 930 | 830 | 70 | -0.02 | 540 | 50 |
| 2-35 | | 2-C | 25 | | 900 | 960 | 830 | 130 | -0.01 | 530 | 40 |
| 2-36 | | 2-I | 15 | | 910 | 940 | Air cooling | 130 | -0.01 | 470 | 50 |
| 2-37 | | 2-I | 25 | | 910 | 950 | 820 | 80 | -0.02 | 530 | 40 |
| 2-38 | | 2-I | 35 | | 910 | 960 | 840 | 80 | -0.02 | 520 | 40 |
| 2-39 | Comparative | 2-B | 15 | | 930 | 760 | 700 | 50 | -0.12 | 540 | 60 |
| 2-40 | example | 2-B | 35 | | 930 | 960 | Air cooling | 430 | -0.10 | 450 | 40 |
| 2-41 | | 2-C | 10 | | 900 | 770 | Air cooling | 120 | -0.11 | 480 | 70 |
| 2-42 | | 2-C | 25 | | 900 | 1000 | 940 | 70 | -0.02 | 500 | 20 |
| 2-43 | | 2-I | 15 | | 910 | 770 | Air cooling | 80 | -0.12 | 480 | 60 |
| 2-44 | | 2-I | 25 | | 910 | 820 | 640 | 450 | -0.11 | 530 | 50 |

INDUSTRIAL APPLICABILITY

According to the present invention, it is possible to provide an economic and alloying element-saving hot rolled duplex stainless steel material having a high strength. In addition, according to the present invention, it is possible to provide an economic alloying element-saving clad steel plate having favorable corrosion resistance and favorable toughness. The hot rolled duplex stainless steel material and the clad steel plate of the present invention can be used for seawater desalination instruments, tanks in a shipping vessel, a variety of containers and the like; and therefore, the present invention can make an extremely significant contribution to the industry.

The invention claimed is:

1. An alloying element-saving hot rolled duplex stainless steel material comprising, by mass %:
C: 0.03% or less;
Si: 0.05% to 1.0%;
Mn: 0.5% to 7.0%;
P: 0.05% or less;
S: 0.010% or less;
Ni: 0.1% to 5.0%;
Cr: 18.0% to 25.0%;
N: 0.05% to 0.30%; and
Al: 0.001% to 0.05%,
with a remainder being Fe and inevitable impurities, wherein:
said alloying element-saving hot rolled duplex stainless steel material is produced by hot rolling,
said alloying element-saving hot rolled duplex stainless steel material is not subjected to a solution heat treatment,
a chromium nitride precipitation temperature TN, which is an index regarding precipitation of chromium nitrides during the hot rolling, is in a range of 960° C. or lower,
a yield strength of said alloying element-saving hot rolled duplex stainless steel material is 50 MPa or more higher than that of a solution heat-treated hot rolled steel material having the same composition as the alloying element-saving hot rolled duplex stainless steel material, the solution treatment including soaking at a temperature of 1000° C. for 5 minutes and subsequent water cooling to room temperature,
an impact value at -20° C. is 50 J/cm² or more,
a difference between a potential of said alloying element-saving hot rolled duplex stainless steel material, which is not subjected to a solution heat treatment, and a potential of the solution heat-treated hot rolled steel material is 0.05V or less, the solution treatment including soaking at a temperature of 1000° C. for 5 minutes and subsequent water cooling to room temperature, the potential being measured by a method specified in JIS G0577, and the potential being a potential at which a current density corresponds to 100 μA/cm², and
the chromium nitride precipitation temperature TN is obtained by a measuring method including: a step in which the solution treatment of the solution heat-treated hot rolled steel material includes soaking at a temperature of 1000° C. for 5 minutes and subsequent water cooling to room temperature; a step in which the solution heat-treated hot rolled steel material is subjected to soaking at a temperature of 800° C. to 1000° C. for 20 minutes, and then water cooling is conducted after a time of 5 seconds or less is passed; a subsequent step in which a precipitation amount of chromium nitrides in the cooled steel material is measured by an electroextraction residue analyzing method of non-metallic inclusions; and a step in which among soaking temperatures at which a Cr residue amount becomes in a range of 0.01% or less, the lowest temperature is used as the chromium nitride precipitation temperature TN.

2. An alloying element-saving hot rolled duplex stainless steel material comprising, by mass %:
C: 0.03% or less;
Si: 0.05% to 1.0%;
Mn: 0.5% to 7.0%;
P: 0.05% or less;
S: 0.010% or less;
Ni: 0.1% to 5.0%;
Cr: 18.0% to 25.0%;
N: 0.05% to 0.30%; and
Al: 0.001% to 0.05%, and further comprising one or more selected from:
V: 0.05% to 0.5%;
Nb: 0.01% to 0.20%; and
Ti: 0.003% to 0.05%,
with a remainder being Fe and inevitable impurities, wherein:
said alloying element-saving hot rolled duplex stainless steel material is produced by hot rolling,
said alloying element-saving hot rolled duplex stainless steel material is not subjected to a solution heat treatment,
a chromium nitride precipitation temperature TN2, which is a second index regarding precipitation of chromium nitrides during the hot rolling, is in a range of 960° C. or lower,
a yield strength of said alloying element-saving hot rolled duplex stainless steel material is 50 MPa or more higher than that of a solution heat-treated hot rolled steel material having the same composition as the alloying element-saving hot rolled duplex stainless steel material, the solution treatment including soaking at a temperature of 1000° C. for 5 minutes and subsequent water cooling to room temperature,
an impact value at −20° C. is 50 J/cm$^2$ or more,
a difference between a potential of said alloying element-saving hot rolled duplex stainless steel material, which is not subjected to a solution heat treatment, and a potential of the solution heat-treated hot rolled steel material is 0.05V or less, the solution treatment including soaking at a temperature of 1000° C. for 5 minutes and subsequent water cooling to room temperature, the potential being measured by a method specified in JIS G0577, and the potential being a potential at which a current density corresponds to 100 μA/cm$^2$, and
the chromium nitride precipitation temperature TN2 is obtained by a measuring method including: a step in which the solution treatment of the solution heat-treated hot rolled steel material includes soaking at a temperature of 1000° C. for 5 minutes and subsequent water cooling to room temperature; a step in which the solution heat-treated hot rolled steel material is subjected to soaking at a temperature of 800° C. to 1000° C. for 20 minutes, and then water cooling is conducted after a time of 5 seconds or less is passed; a subsequent step in which a precipitation amount of chromium nitrides in the cooled steel material is measured by an electroextraction residue analyzing method of non-metallic inclusions; and a step in which among soaking temperatures at which a Cr residue amount becomes in a range of 0.03% or less, the lowest temperature is used as the chromium nitride precipitation temperature TN2.

3. The alloying element-saving hot rolled duplex stainless steel material which is not subjected to a solution heat treatment according to claim 1 or 2, which further comprises one or more elements selected from:
Mo: 1.5% or less;
Cu: 2.0% or less;
W: 1.0% or less;
Co: 2.0% or less;
B: 0.0050% or less;
Ca: 0.0050% or less;
Mg: 0.0030% or less; and
REM: 0.10% or less.

4. A method for producing the alloying element-saving hot rolled duplex stainless steel material which is not subjected to a solution heat treatment according to claim 1 or 2, the method comprising:
subjecting a billet having the chemical composition according to claim 1 or 2 to hot rolling; and
subsequently cooling a hot rolled steel material,
wherein in the case where V, Nb and Ti, which are selective components, are not contained, an input side temperature TF of a final finishing rolling pass of the hot rolling is adjusted so as to fulfill the following formula (1), in the case where the selective components are contained, the input side temperature TF of the final finishing rolling pass of the hot rolling is adjusted so as to fulfill the following formula (2),
the hot rolled steel material is cooled in a temperature range from the input side temperature TF of the final finishing rolling pass of the hot rolling to 600° C. for a time of 5 minutes or less, and
the method does not include a solution heat treatment, $$TF \geq TN-30 \tag{1}$$

$$TF \geq TN2-30 \tag{2}.$$

5. The method for producing the alloying element-saving hot rolled duplex stainless steel material according to claim 4,
wherein a plate thickness exceeds 20 mm, and
in the case where V, Nb and Ti, which are the selective components, are not contained, accelerated cooling is initiated from an accelerated cooling initiation temperature TC after an end of the hot rolling, that fulfills the following formula (3), and, in the case where the selective components are contained, accelerated cooling is initiated from an accelerated cooling initiation temperature TC after the end of the hot rolling that fulfills the following formula (4), and thereby, the hot rolled steel material is cooled in a temperature range from the input side temperature TF of the final finishing rolling pass of the hot rolling to 600° C. for a time of 5 minutes or less, $$TN-200 \leq TC \leq TN+50 \text{ (here, } TF \geq TC\text{)} \tag{3}$$

$$TN2-200 \leq TC \leq TN2+50 \text{ (here, } TF \geq TC\text{)} \tag{4}.$$

6. A clad steel plate comprising:
a steel plate of a base metal; and
a steel plate of a cladding material joined to either or both of two main surfaces of the steel plate of said base metal by hot rolling, wherein:
said cladding material consists of a duplex stainless steel, the duplex stainless steel contains, by mass %:
C: 0.03% or less;
Si: 0.05% to 1.0%;
Mn: 0.5% to 7.0%;
P: 0.05% or less;
S: 0.010% or less;
Ni: 0.1% to 5.0%;
Cr: 18.0% to 25.0%;
N: 0.05% to 0.30%; and
Al: 0.001% to 0.05%,
with a remainder being Fe and inevitable impurities,
said cladding material is not subjected to a solution heat treatment,
a pitting potential difference between a potential of said cladding material, which is not subjected to a solution heat treatment, and a potential of a solution heat-treated cladding material having the same composition as the duplex stainless steel is in a range of less than 0.10 V, the solution treatment including soaking at a temperature of 1000° C. for 5 minutes and subsequent water cooling to room temperature,
an impact value of said base metal at −20° C. is in a range of 40 J/cm² or more, and
a chromium nitride precipitation temperature TN of said cladding material, which is an index regarding precipitation of chromium nitrides during the hot rolling, is in a range of 800° C. to 970° C.,
the chromium nitride precipitation temperature TN is obtained by a measuring method including: a step in which the solution treatment of the solution heat-treated cladding material includes soaking at a temperature of 1000° C. for 5 minutes and subsequent water cooling to room temperature; a step in which the solution heat-treated cladding material is subjected to soaking at a temperature of 800° C. to 1000° C. for 20 minutes, and then water cooling is conducted after a time of 5 seconds or less is passed; a subsequent step in which a precipitation amount of chromium nitrides in the cooled steel material is measured by an electro-extraction residue analyzing method of non-metallic inclusions; and a step in which among soaking temperatures at which a Cr residue amount becomes in a range of 0.01% or less, the lowest temperature is used as the chromium nitride precipitation temperature TN.

7. A clad steel plate comprising:
a steel plate of a base metal; and
a steel plate of a cladding material joined to either or both of two main surfaces of the steel plate of said base metal by hot rolling,
wherein:
said cladding material consists of a duplex stainless steel, the duplex stainless steel contains, by mass %:
C: 0.03% or less;
Si: 0.05% to 1.0%;
Mn: 0.5% to 7.0%;
P: 0.05% or less;
S: 0.010% or less;
Ni: 0.1% to 5.0%;
Cr: 18.0% to 25.0%;
N: 0.05% to 0.30%; and
Al: 0.001% to 0.05%, and
further contains one or more selected from:
V: 0.05% to 0.5%;
Nb: 0.01% to 0.20%; and
Ti: 0.003% to 0.05%,
with a remainder being Fe and inevitable impurities,
said cladding material is not subjected to a solution heat treatment,
a pitting potential difference between a potential of said cladding material, which is not subjected to a solution heat treatment, and a potential of a solution heat-treated cladding material having the same composition as the duplex stainless steel is in a range of less than 0.10 V, the solution treatment including soaking at a temperature of 1000° C. for 5 minutes and subsequent water cooling to room temperature,
an impact value of said base metal at −20° C. is in a range of 40 J/cm² or more, and
a chromium nitride precipitation temperature TN2 of said cladding material, which is a second index regarding precipitation of chromium nitrides during the hot rolling, is in a range of 800° C. to 970° C.,
the chromium nitride precipitation temperature TN2 is obtained by a measuring method including: a step in which the solution treatment of the solution heat-treated cladding material includes soaking at a temperature of 1000° C. for 5 minutes and subsequent water cooling to room temperature; a step in which the solution heat-treated cladding material is subjected to soaking at a temperature of 800° C. to 1000° C. for 20 minutes, and then water cooling is conducted after a time of 5 seconds or less is passed; a subsequent step in which a precipitation amount of chromium nitrides in the cooled steel material is measured by an electro-extraction residue analyzing method of non-metallic inclusions; and a step in which among soaking temperatures at which a Cr residue amount becomes in a range of 0.03% or less, the lowest temperature is used as the chromium nitride precipitation temperature TN2.

8. The clad steel plate including the duplex stainless steel as the cladding material according to claim 6 or 7,
wherein the duplex stainless steel further contains one or more elements selected from:
Mo: 1.5% or less;
Cu: 2.0% or less;
W: 1.0% or less;
Co: 2.0% or less;
B: 0.0050% or less;
Ca: 0.0050% or less;
Mg: 0.0030% or less; and
REM: 0.10% or less.

9. A method for producing the clad steel plate according to claim 6 or 7, the method comprising:
joining a steel plate of a base metal and a steel plate of a cladding material having a chemical component according to claim 6 or 7 by hot rolling; and subsequently conducting cooling,
wherein in the case where the cladding material does not contain V, Nb and Ti, which are selective components, an input side temperature TF of a final finishing rolling pass of the hot rolling is adjusted so as to fulfill the following formula (5), in the case where the cladding material contains the selective components, the input side temperature TF of the final finishing rolling pass of the hot rolling is adjusted so as to fulfill the following formula (6), and
the plates are cooled in a temperature range from the input side temperature TF of the final finishing rolling pass of the hot rolling to 600° C. for a time of 5 minutes or less, and
the method does not include a solution heat treatment, $$TF \geq TN - 100 \tag{5}$$

$$TF \geq TN2 - 100 \tag{6}$$

10. The method for producing the clad steel plate using the duplex stainless steel as the cladding material according to claim 9,
wherein, in the case where the cladding material does not contain V, Nb and Ti, which are selective components, accelerated cooling is initiated from an accelerated cooling initiation temperature TC after an end of the hot rolling that fulfills the following formula (7), and, in the case where the cladding material contains the selective components, accelerated cooling is initiated from an accelerated cooling initiation temperature TC after the end of the hot rolling that fulfills the following formula (8), and thereby, the plates are cooled in the temperature range from the input side temperature TF of the final finishing rolling pass of the hot rolling to 600° C. for a time of 5 minutes or less, $$TC \geq TN-250 \text{ (here, } TF \geq TC\text{)} \tag{7}$$

$$TC \geq TN2-250 \text{ (here, } TF \geq TC\text{)} \tag{8}$$

11. A method for producing the alloying element-saving hot rolled duplex stainless steel material which is not subjected to a solution heat treatment according to claim 3, the method comprising:
subjecting a billet having the chemical composition according to claim 3 to hot rolling; and
subsequently cooling a hot rolled steel material,
wherein in the case where V, Nb and Ti, which are selective components, are not contained, an input side temperature TF of a final finishing rolling pass of the hot rolling is adjusted so as to fulfill the following formula (1), in the case where the selective components are contained, the input side temperature TF of the final finishing rolling pass of the hot rolling is adjusted so as to fulfill the following formula (2),
the hot rolled steel material is cooled in a temperature range from the input side temperature TF of the final finishing rolling pass of the hot rolling to 600° C. for a time of 5 minutes or less, and
the method does not include a solution heat treatment, $$TF \geq TN-30 \tag{1}$$

$$TF \geq TN2-30 \tag{2}$$

12. The method for producing the alloying element-saving hot rolled duplex stainless steel material according to claim 11,
wherein a plate thickness exceeds 20 mm, and
in the case where V, Nb and Ti, which are the selective components, are not contained, accelerated cooling is initiated from an accelerated cooling initiation temperature TC after an end of the hot rolling that fulfills the following formula (3), and, in the case where the selective components are contained, accelerated cooling is initiated from an accelerated cooling initiation temperature TC after the end of the hot rolling that fulfills the following formula (4), and thereby, the hot rolled steel material is cooled in a temperature range from the input side temperature TF of the final finishing rolling pass of the hot rolling to 600° C. for a time of 5 minutes or less, $$TN-200 \leq TC \leq TN+50 \text{ (here, } TF \geq TC\text{)} \tag{3}$$

$$TN2-200 \leq TC \leq TN2+50 \text{ (here, } TF \geq TC\text{)} \tag{4}$$

13. A method for producing the clad steel plate according to claim 8, the method comprising:
joining a steel plate of a base metal and a steel plate of a cladding material having a chemical component according to claim 9 by hot rolling; and subsequently conducting cooling,
wherein in the case where the cladding material does not contain V, Nb and Ti, which are selective components, an input side temperature TF of a final finishing rolling pass of the hot rolling is adjusted so as to fulfill the following formula (5), in the case where the cladding material contains the selective components, the input side temperature TF of the final finishing rolling pass of the hot rolling is adjusted so as to fulfill the following formula (6), and
the plates are cooled in a temperature range from the input side temperature TF of the final finishing rolling pass of the hot rolling to 600° C. for a time of 5 minutes or less, and
the method does not include a solution heat treatment, $$TF \geq TN-100 \tag{5}$$

$$TF \geq TN2-100 \tag{6}$$

14. The method for producing the clad steel plate using the duplex stainless steel as the cladding material according to claim 13,
wherein, in the case where the cladding material does not contain V, Nb and Ti, which are selective components, accelerated cooling is initiated from an accelerated cooling initiation temperature TC after an end of the hot rolling that fulfills the following formula (7), and, in the case where the cladding material contains the selective components, accelerated cooling is initiated from an accelerated cooling initiation temperature TC after the end of the hot rolling that fulfills the following formula (8), and thereby, the plates are cooled in the temperature range from the input side temperature TF of the final finishing rolling pass of the hot rolling to 600° C. for a time of 5 minutes or less, $$TC \geq TN-250 \text{ (here, } TF \geq TC\text{)} \tag{7}$$

$$TC \geq TN2-250 \text{ (here, } TF \geq TC\text{)} \tag{8}$$

* * * * *